United States Patent
Donderici

(10) Patent No.: US 9,841,526 B2
(45) Date of Patent: Dec. 12, 2017

(54) FORMATION IMAGING WITH MULTI-POLE ANTENNAS

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/646,178

(22) PCT Filed: Dec. 31, 2012

(86) PCT No.: PCT/US2012/072320
§ 371 (c)(1),
(2) Date: May 20, 2015

(87) PCT Pub. No.: WO2014/105086
PCT Pub. Date: Jul. 3, 2014

(65) Prior Publication Data
US 2015/0301218 A1 Oct. 22, 2015

(51) Int. Cl.
*G01V 3/26* (2006.01)
*G01V 3/20* (2006.01)
*G01V 3/18* (2006.01)
*G01V 3/28* (2006.01)

(52) U.S. Cl.
CPC ............... *G01V 3/26* (2013.01); *G01V 3/18* (2013.01); *G01V 3/20* (2013.01); *G01V 3/28* (2013.01)

(58) Field of Classification Search
CPC ... G01V 3/18; G01V 3/20; G01V 3/28; G01V 3/26
See application file for complete search history.

(56) References Cited

U.S. PATENT DOCUMENTS

| 5,955,884 A * | 9/1999 | Payton | G01V 3/26 324/339 |
|---|---|---|---|
| 6,181,138 B1 | 1/2001 | Hagiwara et al. | |
| 6,819,111 B2 | 11/2004 | Fanini et al. | |
| 6,903,553 B2 | 6/2005 | Itskovich et al. | |

(Continued)

FOREIGN PATENT DOCUMENTS

| AU | 2012397814 B2 | 2/2017 |
|---|---|---|
| CN | 2621300 Y | 6/2004 |

(Continued)

OTHER PUBLICATIONS

"International Application Serial No. PCT/US2012/072316, International Preliminary Report on Patentability dated Apr. 9, 2015", 22 pgs.

(Continued)

*Primary Examiner* — Patrick Assouad
*Assistant Examiner* — Haidong Zhang
(74) *Attorney, Agent, or Firm* — Gilliam IP PLLC

(57) ABSTRACT

Various embodiments include systems and methods that operate to provide reservoir imaging. The systems and methods can include a number of transmitter antennas and a number of receiving antennas arranged to operate as one or more multi-pole antennas, controlled to generate high resolution cross-well formation images. Additional apparatus, systems, and methods are disclosed.

23 Claims, 14 Drawing Sheets

(56) References Cited

U.S. PATENT DOCUMENTS

| | | | |
|---|---|---|---|
| 2001/0004212 A1* | 6/2001 | Omeragic | G01V 3/28 324/338 |
| 2004/0046561 A1 | 3/2004 | Itskovich et al. | |
| 2005/0140373 A1 | 6/2005 | Li et al. | |
| 2005/0189947 A1 | 9/2005 | Haugland | |
| 2008/0158082 A1 | 7/2008 | Wang et al. | |
| 2008/0224707 A1 | 9/2008 | Wisler et al. | |
| 2009/0091328 A1* | 4/2009 | Clark | G01V 3/28 324/338 |
| 2009/0205899 A1 | 8/2009 | Geerits et al. | |
| 2009/0295393 A1 | 12/2009 | Bespalov et al. | |
| 2009/0295993 A1 | 12/2009 | Chhokra | |
| 2010/0156424 A1 | 6/2010 | Bittar et al. | |
| 2010/0231221 A1* | 9/2010 | Rosthal | G01V 3/28 324/339 |
| 2010/0277177 A1* | 11/2010 | Alumbaugh | G01V 3/38 324/338 |
| 2010/0305863 A1 | 12/2010 | Abubakar et al. | |
| 2010/0308832 A1 | 12/2010 | Clark et al. | |
| 2012/0242342 A1 | 9/2012 | Rabinovich et al. | |
| 2015/0338542 A1 | 11/2015 | Donderici | |

FOREIGN PATENT DOCUMENTS

| | | |
|---|---|---|
| CN | 102162358 A | 8/2011 |
| EP | 0544584 A1 | 6/1993 |
| RU | 2368922 C2 | 9/2009 |
| RU | 2421760 C1 | 6/2011 |
| WO | WO-00/50926 A1 | 8/2000 |
| WO | WO-2008/061114 A2 | 5/2008 |
| WO | WO-2008/115229 A1 | 9/2008 |
| WO | WO-2012030327 A1 | 3/2012 |
| WO | WO-2014105084 A1 | 7/2014 |
| WO | WO-2014105086 A1 | 7/2014 |

OTHER PUBLICATIONS

"International Application Serial No. PCT/US2012/072316, International Search Report dated Aug. 27, 2013", 3 pgs.

"International Application Serial No. PCT/US2012/072316, Written Opinion dated Aug. 27, 2013", 8 pgs.

"International Application Serial No. PCT/US2012/072320, International Search Report dated Aug. 27, 2013", 3 pgs.

"International Application Serial No. PCT/US2012/072320, Written Opinion dated Aug. 27, 2013", 6 pgs.

Cox, Barbara E., "Tomographic inversion of focusing operators", Thesis, Technische Universiteit Delft, (2004), 230 pgs.

Nakagawa, Seiji, et al., "Analytical modeling of wave generation by the Borehole Orbital Vibrator Software", 1-27.

"Australian Application Serial No. 2012397814, First Examiner Report dated Mar. 3, 2016", 3 pgs.

"Australian Application Serial No. 2012397814, Response dated Aug. 22, 2016 to First Examiner Report dated Mar. 3, 2016", 21 pgs.

"Canadian Application Serial No. 2,895,018, Office Action dated Jul. 15, 2016", 3 pgs.

"Chinese Application Serial No. 2012800775771, Office Action dated Jul. 22, 2016", (w/ English Translation), 15 pgs.

"European Application Serial No. 12890882.9, Partial Supplementary European Search Report dated Jun. 23, 2016", 8 pgs.

"European Application Serial No. 12890882.9, Response filed Nov. 4, 2015 to Office Action dated Jun. 26, 2015", 26 pgs.

"European Application Serial No. 12891146.8, Extended European Search Report dated Jul. 22, 2016", 9 pgs.

"European Application Serial No. 12891146.8, Office Action dated Aug. 9, 2016", 2 pgs.

Li, Yu-Xia, et al., "Multi-Pole Array Acoustic Lodging Tool (MPAL)", *Proceedings of the 6th Logging Symposium of the Chinese Petroleum Society*, (Jul. 2010), 86-96.

"Canadian Application Serial No. 2,895,022, Office Action dated Sep. 19, 2016", 4 pgs.

"Canadian Application Serial No. 2,895,018, Office Action dated Feb. 13, 2017", 3 pages.

"Mexican Patent Application No. MX/a/2015/006566; Office Action dated Feb. 12, 2017.", 1 page.

"Russian Federation Application Serial No. 2015119890, Office Action dated Sep. 2, 2016", (w/ English Translation), 15 pgs.

\* cited by examiner

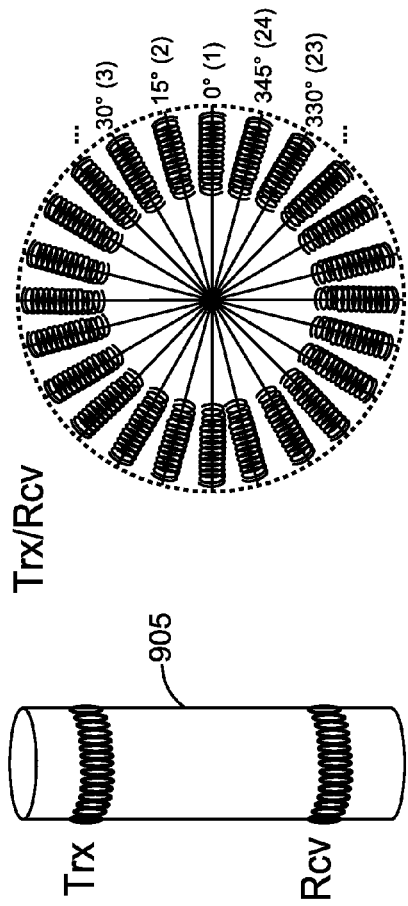

FORMATION IMAGING WITH MULTI-POLE ANTENNAS

RELATED APPLICATIONS

This application is related to the co-pending and commonly assigned International Application Serial Number PCT/US2012/072316, titled "DEEP AZIMUTHAL SYSTEM WITH MULTI-POLE SENSORS", filed on even date herewith, Dec. 31, 2012; the content of the co-pending International Application is hereby incorporated into this application by reference in its entirety.

BACKGROUND

In drilling wells for oil and gas exploration, understanding the structure and properties of the geological formation provides information to aid such exploration. Due to the difficult and expensive process of drilling boreholes that is used to gain direct access to the formations, remote reservoir scale sensing methods are utilized to make images of the formations from the surface. The three most popular imaging methods are seismic, which is based on acoustic waves; controlled source electromagnetic (CSEM), which is based on electromagnetic waves; and crosswell electromagnetic tomography (crosswell).

Although the seismic method is widely used, it is only sensitive to mechanical properties of the formations and cannot easily differentiate waterbearing formations from oil-bearing formations. CSEM and crosswell methods, on the other hand, provide electromagnetic measurements that are sensitive to presence of water, since water creates a significant contrast in formation resistivity. However, both CSEM and crosswell methods suffer from low resolution due to conductive losses and the dispersive characteristics of formations at low frequencies. To overcome this difficulty, a priori information, perhaps obtained from a pilot well, is often used to produce an initial guess of formation properties between the wells used to gather measurements. However, the use of a priori information often produces a biased, and consequently unreliable, result.

BRIEF DESCRIPTION OF THE DRAWINGS

FIG. 6A illustrates an example a multi-pole induction tool via individually controlled coils, in accordance with various embodiments.

FIG. 6B shows a top down view of the individual coils around the circumference of the multi-pole induction tool of FIG. 6A, in accordance with various embodiments.

FIG. 6C shows, in table form, example excitation polarities used for different modes to apply to the coils of the multi-pole induction tool of FIG. 6A, in accordance with various embodiments.

DETAILED DESCRIPTION

To address the issue of low resolution, described above, various embodiments use multi-pole antennas located within at least two wells within a reservoir. The use of multi-pole, rather than dipole, antennas provides enhanced azimuthal sensitivity. From more than one borehole, it creates high resolution, cross-well tomographic images, of the formation disposed between two or more wells.

Figure 1:
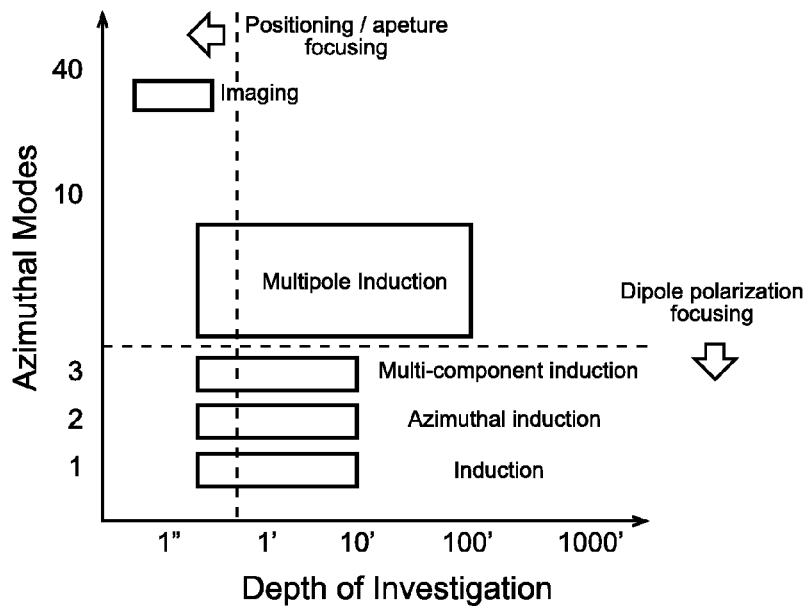
FIG. 1 illustrates the available azimuthal modes with respect to depth of investigation for positioning, aperture, polarization focusing, and multi-pole induction methodologies in single borehole applications.

FIG. 1 illustrates the available azimuthal modes with respect to depth of investigation for positioning, aperture, polarization focusing, and multi-pole induction methodologies in a single borehole application. The application of focusing by positioning is illustrated in the figure on the left of the vertical dotted line. The application of focusing by aperture is also shown in the figure on the left of the vertical dotted line. The modal limits of focusing by polarization are shown below the horizontal dotted line.

With respect to azimuthal modes related to depth of investigation, an example multi-pole induction system can provide applications in the regions of FIG. 1 above the horizontal dotted line and to the right of the vertical dotted line. In addition, multi-pole induction methodology can provide application in the regions of the plot of FIG. 1 above the horizontal dotted line and to the left of the vertical dotted line.

In various embodiments, systems and methods include one or more multi-pole antennas arranged to generate deep high-order azimuthal sensitivity. "Deep" means the range at which an approaching electromagnetic scatterer (such as a boundary) is detected and the range is substantially linearly proportional to the distance between the sensing transmitter and receiver. This is opposed to a range being proportional to the size of the borehole. "High-order azimuthal sensitivity" means a sensitivity pattern being periodic in shape with the periodicity greater than 2. The periodic shape can be sinusoidal or any other periodic shape. "Deep high-order azimuthal sensitivity" means the combination of deep and higher-order azimuthal sensitivity as discussed above.

Thus, FIG. 1 shows multi-pole induction capability according to various embodiments in comparison to existing tools to summarize new capabilities. In this figure, the X axis shows the depth of investigation ranging from 1 in. to 1,000 ft. The figure also shows the azimuthal modes that can be obtained with a multi-pole tool, which range from 1 to 40.

Traditional induction tools, which use only axially oriented antennas (e.g., ZZ antennas), are azimuthally insensitive in the far field and, consequently, cannot differentiate multiple features in the azimuthal direction. These have only one azimuthal mode ($0^{th}$ mode), and can give only a single-valued measurement. Their depth of investigation ranges from a couple of inches to approximately 10 ft.

Azimuthal induction provides azimuthal information. A tool with a tilted antenna, such as an azimuthal induction tool with two channels, a ZZ channel and a ZX channel, can provide two azimuthal modes: the $0^{th}$ and $1^{st}$ modes. An example of such a tool might include a Halliburton ADR™ sensor tool, available from the Halliburton Company of Houston, Tex.

Multicomponent induction tools have XY components, which provide an additional azimuthal mode: the $2^{nd}$ sinusoidal mode. As a result, multicomponent tools can produce $0^{th}$, $1^{st}$, and $2^{nd}$ modes. But a tool that has a transmitter comprising a single dipole antenna, and a receiver comprising a single dipole antenna, is physically incapable of being used to produce anything more than these three ($0^{th}$, $1^{st}$, $2^{nd}$) deep azimuthal modes.

The use of multi-pole antennas, as described herein, breaks this modal barrier to provide deep sensitivity at higher mode numbers. For the purposes of this document, a "multi-pole antenna" is one that can create electric fields with substantially high-order harmonic azimuthal distribution, i.e. $E_q(\phi) = K(r) \exp(i(n\phi + \phi_0))$, where $n > 2$ and $r > r_0$, $\phi$ is the azimuthal angle in cylindrical coordinates that is centered at the antenna, $\phi_0$ is a phase, $r_0$ is a distance comparable to wavelength, q is a cylindrical or spherical coordinate, and i is the imaginary number. For example, as described in more detail below, a multi-pole antenna may comprise multiple dipole antennas having controlled polarity. It is understood that due to the harmonic nature of the multi-pole antenna, in some embodiments, multi-poles with different orders n can be combined to generate a desired azimuthal field pattern based on the Fourier series.

Figure 2:
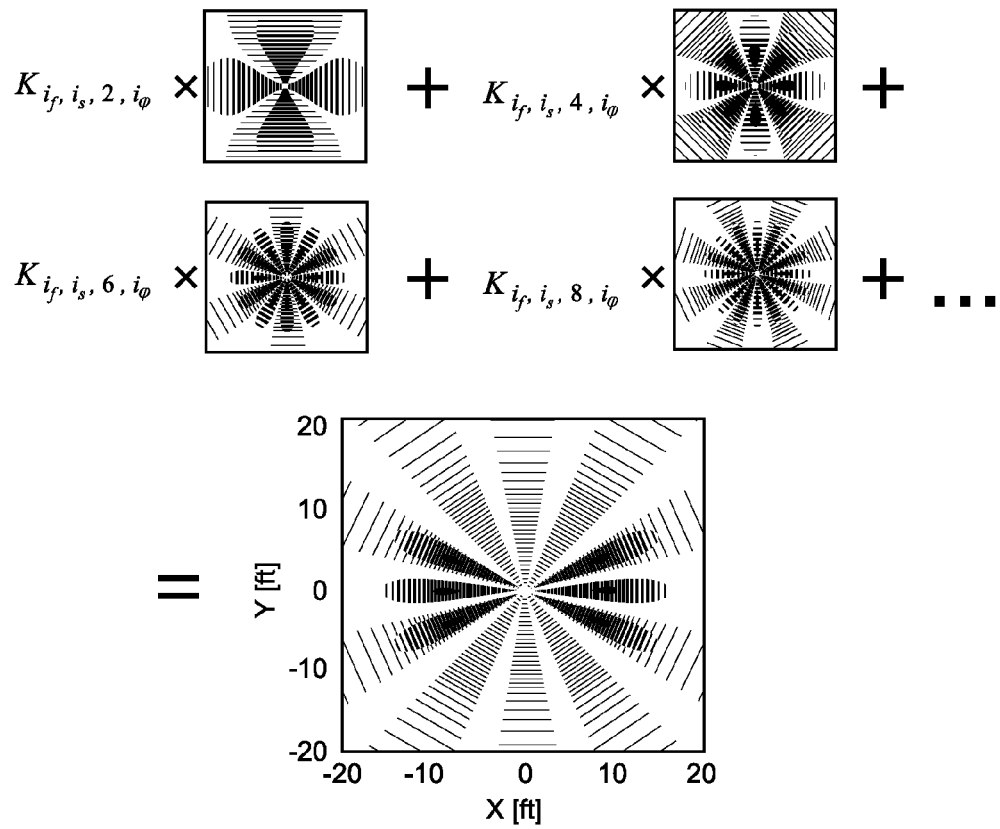
FIG. 2 illustrates deep focusing sensitivity via multi-pole induction, in a single borehole application.

FIG. 2 illustrates deep focusing sensitivity via multi-pole induction in a single borehole application. In FIG. 2, the combination of higher order azimuthal modes in sensitivity are shown, where the coefficients K for modes 2, 4, 6, and 8 are for normalization. In this example, these modes are combined. The subscripts $i_f$, $i_s$, and $i_\phi$ are indices of frequency, spacing, and azimuthal angle. Such induction systems may produce high-order azimuthal modes in sensitivity; achieve deep azimuthal sensitivity; produce deep 3D images of formation properties; improve formation evaluation and geophysical/geomechanical interpretation significantly; improve geosteering significantly; and improve detection, assessment, and recovery of hydrocarbons.

In this figure it can be seen how different multi-pole antenna results can be combined to obtain high azimuthal sensitivity using a multi-pole transmitter and receiver antennas in the same borehole. At the top-left of this figure, mode 2 is shown. At the top-right of this figure, multi-pole mode 4 is shown. Below modes 2 and 4 are shown modes 6 and 8, respectively.

Mode 8 is very sensitive azimuthally, but it is not uni-directional. The distinctive flower-shaped pattern is very sharp, which permits differentiating small angular differences—in multiple directions. In other words, mode 8 is sensitive in each of the azimuthal directions of 0 degrees, 45 degrees, 90 degrees, etc. However, to obtain directional sensitivity, it would be ideal if mode 8 was sensitive in only one direction, such as 0 degrees. Using Fourier series analysis of azimuthal sensitivity patterns, it can be shown that the desired uni-directional behavior can be obtained by combining modes 2, 4, 6, and 8 with correct scaling factors, as shown at the bottom of FIG. 2.

It should be noted that FIG. 2 does not show the radiation pattern of a transmitter or receiver. Instead, the sensitivity of a combined system comprising a transmitter and receiver is shown. However, multi-pole operation that is both deep and azimuthally sensitive does not occur via the random combination of two multi-pole antennas. Instead, to achieve the desired sensitivity pattern, a special configuration of multi-pole antennas must be selected. Several such unique configurations are described herein.

Figure 3:
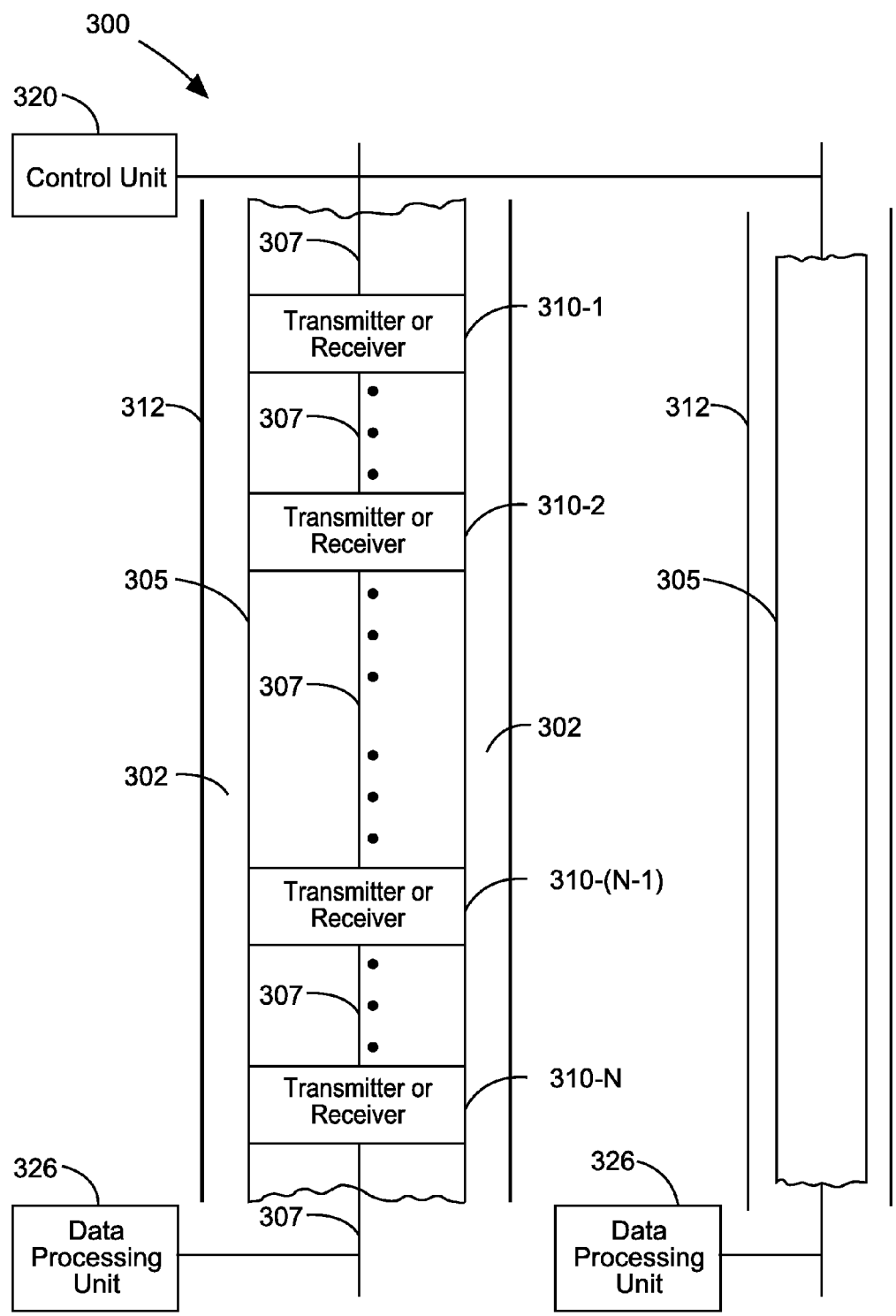
FIG. 3 shows a block diagram of an example system having multiple tools to make measurements to provide higher order azimuthal sensitivity, along with cross-well imaging, in accordance with various embodiments.

FIG. 3 shows a block diagram of an example system having multiple tools to make measurements to provide higher order azimuthal sensitivity, along with cross-well imaging, in accordance with various embodiments.

Tool 305 can have an arrangement of transmitting antennas and receiving antennas such as transmitters and receivers 310-1, 310-2 . . . 310-(N−1), 310-N structured relative to a longitudinal axis 307 of tool 305. The transmitters and receivers 310-1, 310-2 . . . 310-(N−1), 310-N can be arranged to provide multi-pole antenna operation. An arrangement of transmitter antennas and receiver antennas can be structured along longitudinal axis 307 of tool 305, which is substantially perpendicular to the cross section of the tool, for example corresponding to the cross section of a collar in a drill string.

The arrangement of transmitters and receivers 310-1, 310-2 . . . 310-(N−1), 310-N can be operated by selecting transmitter—receiver pairs defined by the spacing between the transmitter and the receiver in each respective pair, or by the arrangement of transmitters in one borehole 312, and receivers in another borehole 312. Large spacings can be used to probe ahead of the drill bit and acquire deep signals. Smaller spacings can be used to probe in the formation regions around tool 305. For example, a shallow measurement may include contributions from regions about one inch to about 10 ft from the tool and a deep measurement may include contributions from regions about 5 ft to about 200 ft from the tool.

Apparatus 300 can include a control unit 320 to control activation of the transmitters of tool 305 and reception of signals at the receivers of tool 305. The transmitters of one tool 305 and the receivers of another tool 305 may be disposed in different boreholes 312. Control unit 320 can be structured to operatively select antennas from a plurality of antennas in one or more transmitter—receiver pairs arranged to provide higher order azimuthal sensitivity when the apparatus is operated downhole in one or more wells (e.g., when transmitters on a first tool are located in one borehole, and receivers on a second tool are located in another borehole, for cross-well imaging). Control unit 320 can be operated in conjunction with data processing unit 326 to process signals received from the receivers in tool 305.

Data processing unit 326 can be structured to operatively process data from one or more deep measurements. Data processing unit 326 can include instrumentalities to perform one or more techniques to process signals from the receivers in the arrangement of transmitters and receivers 310-1, 310-2 . . . 310-(N−1), 310-N. Data processing unit 326 also can use the generated signals to determine formation properties around the borehole, or between boreholes, in which the tool, or tools is/are disposed. Received signals may be used to make geosteering decisions. Geosteering is an intentional control to adjust the current drilling direction.

The techniques to analyze received signals can include various applications of inversion operations, forward modeling, using synthetic logs, and filtering techniques. Inversion operations can include a comparison of measurements to predictions of a model such that a value or spatial variation of a physical property can be determined. An inversion operation can include determining a variation of electrical conductivity in a formation from measurements of induced electric and magnetic fields. Other techniques, such as a forward model, deal with calculating expected observed values with respect to an assumed model. A synthetic log is a modeled log based on modeled response of the tool in known formation parameters. The synthetic log is created by numerically modeling the interaction of the tool and the formation, usually involving simulation of each depth of the log point by point.

Control unit 320 and/or data processing unit 326 can be integrated with tool 305 such that control unit 320 and/or data processing unit 326 are operable downhole in well 302. Control unit 320 and/or data processing unit 326 can be distributed along tool 305. Control unit 320 and/or data processing unit 326 can be located at the surface of well 302 operably in communication with tool 305 via a communication mechanism. Such a communication mechanism can be realized as a communication vehicle that is standard for well operations. Control unit 320 and/or data processing unit 326 can be distributed along the mechanism by which tool 305 is placed downhole in well 302. Apparatus 300 can be structured for an implementation in the borehole of a well as a measurements-while-drilling (MWD) system such as a logging-while-drilling (LWD) system. Alternatively, apparatus 300 may be configured in a wireline arrangement. As noted previously, the control unit 320 may operate to control multiple tools 305 disposed in multiple boreholes (e.g., to provide cross-well imaging) in some embodiments.

Figure 4A:
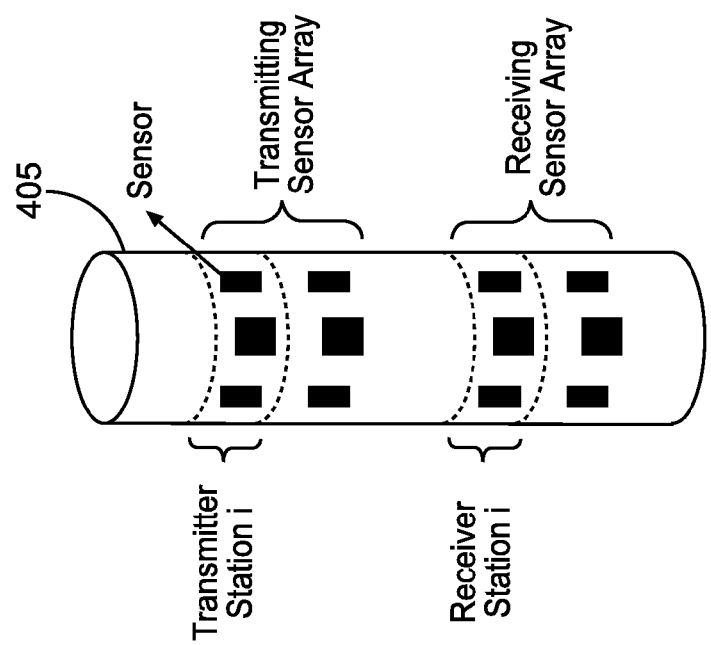
FIG. 4A shows an example embodiment of a tool operable as a sensing system in an induction system to provide polarization focusing, in accordance with various embodiments.

FIG. 4A shows an embodiment of an example tool 405 operable as a sensing system in an induction system to provide polarization focusing. The tool 405 can be used in a system identical to or similar to system 300 of FIG. 3. The tool can be controlled in the induction system to provide a mechanism to achieve a multi-pole sensing system. The tool 405 may comprise transmitting antenna arrays and receiving antenna arrays that form multiple transmitters and receivers, respectively. The transmitters and receivers may be disposed in the same borehole, or on multiple tools in different boreholes. Each transmitter/receiver may be composed of a multitude of antennas that are in different orientations or that are operated with different signal amplitudes. The transmitters and the receivers can be operated in a paired arrangement, whether they are disposed in the same borehole, or in different boreholes. Each transmitter and receiver pair, effectively, can produce a single or a combination of higher order azimuthal modes in sensitivity. Examples of some modes are shown in FIG. 2.

Multiple transmitters/receivers can be used to achieve different depth of detection and can enhance sensitivity in the radial direction. Antennas at each transmitter/receiver may be uniformly or non-uniformly disposed around a circumference of the tool structure on which the antennas are disposed. The antennas may also form arbitrary two-dimensional (2D) or 3D arrays. Even though achieving higher azimuthal sensitivity modes may depend on specific relationships between transmitting and receiving antenna positions, orientations, and strengths, there can still be a large variety of such arrangements. Each antenna can be realized as a magnetic dipole or an electric dipole. An antenna may comprise sets of dipoles of the same or different types.

Figure 4B:
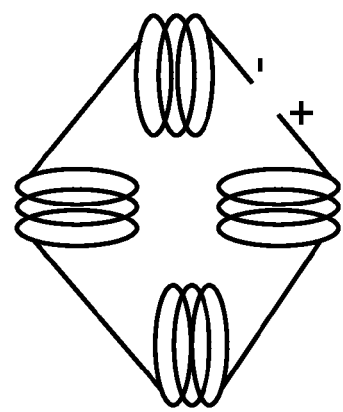
FIG. 4B-4C show example orientations of the dipoles that can be implemented in various stations of FIG. 4A in order to excite higher-modes, in accordance with various embodiments.
Figure 4C:
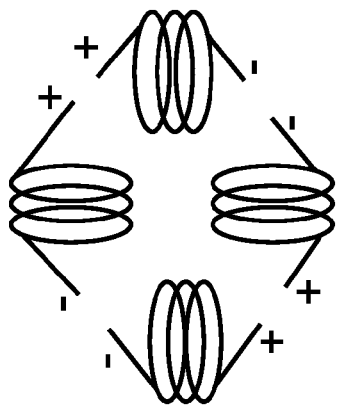

In order to excite higher-order azimuthal modes, orientations of the dipoles in each transmitter/receiver can be varied, as shown by example in FIGS. 4B-4C. In an embodiment, all antennas may be fed with a single wire, alternating the winding direction of the wire as shown in the antenna feed illustrated in FIG. 4B. This allows a natural balance between different antenna strengths, since substantially the same current can pass through each antenna. Separate wires can also be used for each antenna, as shown in the antenna feed illustrated in FIG. 4C. This can allow explicit control of the antenna strengths and help compensate for manufacturing differences between antennas.

Magnetic dipoles can be realized using either coils or solenoids. Realizations of electric dipoles can include wire antennas or toroids. Due to the linearity of electromagnetic wave phenomenon in earth formations, dipoles in different orientations can be synthetically combined after a measurement to produce signals from hypothetical dipoles in different orientations. One configuration that can utilize this mechanism is the tilted coil configuration. Moreover, due to reciprocity, the roles of transmitter and receiver can be interchanged without any change in the properties of the physics of the application.

A depth shift can be applied to signals from transmitter-receiver pairs that are not collocated and that have substantially the same transmitter-receiver separation distance. The depth shift can be adjusted to ensure different pairs are sensitive to substantially the same volume of formation. A tool with various arrangements of transmitters and receivers, as described herein, can be placed in different wells (boreholes), to provide a sensing system for cross-well tomography. Deep and higher resolution cross-well tomographic images can be obtained by utilizing higher order azimuthal modes.

Sensitivity of an antenna system that is composed of a transmitter and a receiver is a product of the spatial transmission pattern of the transmitter and the spatial reception pattern of the receiver. As a result, in order to have azimuthal sensitivity in the system, at least one of the transmitter or receiver should have an azimuthal transmission/reception pattern. It should be noted however, that merely having azimuthal transmission/reception patterns for the antennas (for example via the random use of multi-pole antennas) does not directly lead to having a corresponding azimuthal sensitivity for the combined transmitter-receiver system. In fact, specific relationships between transmitter and receiver antenna positions and orientations, described herein, are used to achieve deep high-order azimuthal sensitivity.

Figure 5:
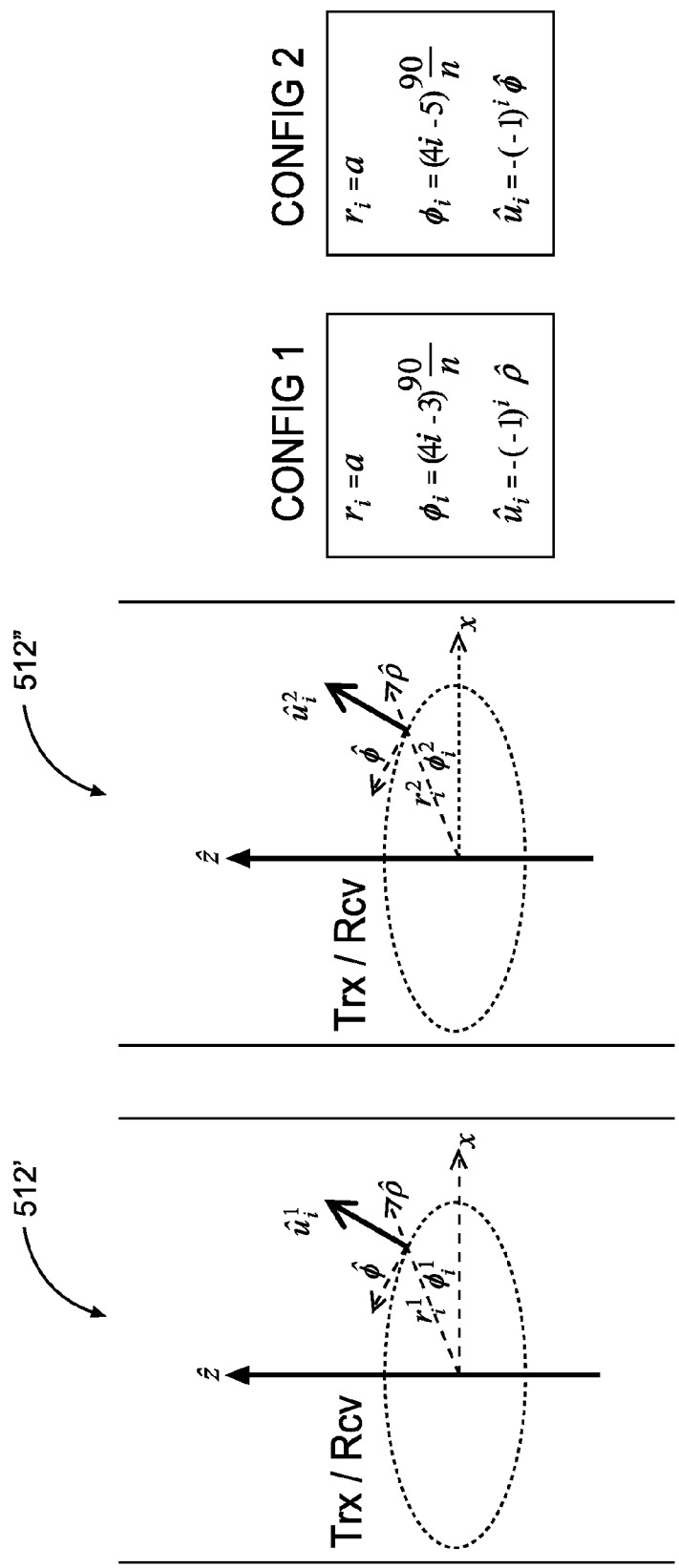
FIG. 5 shows two example antenna configurations that can achieve $n^{th}$ order azimuthal sensitivity, in accordance with various embodiments.

FIG. 5 shows two example antenna configurations that can achieve $n^{th}$ order azimuthal sensitivity, in accordance with various embodiments. Each arrangement is comprised of n transmitting dipole antennas. Configurations CONFIG 1 and CONFIG 2 show two antenna arrangements comprised of n receiving dipole antennas in addition to n transmitting dipole antennas.

The variables $r_i^1$, $\phi_i^1$, $u_i^1$, $r_i^2$, $\phi_i^2$, $u_i^2$ denote the radial position of the $i^{th}$ transmitter or receiver, the angular position of the $i^{th}$ transmitter or receiver in degrees, and the orientation vector of the $i^{th}$ transmitter or receiver, where the transmitter Trx is disposed in a first one boreholes 512', and a receiver Rcv is disposed in a second one of the boreholes 512". In some embodiments, the locations of the transmitter Trx and receiver Rcv are reversed. In some embodiments, one or more transmitters Trx or receivers Rcv are disposed in one or both boreholes 512', 512".

An orientation vector is a vector in the direction of the dipole of the antenna. The vectors $\hat{\rho}$, $\hat{\phi}$ and $\hat{z}$ are the unit vectors in cylindrical coordinates along radial, azimuthal, and z-directions. Since the orientation vector relates to direction only, an orientation vector $u_i$ is a unit vector $\hat{u}_i$. The parameter a is the radius of the circle where the antennas are disposed, that is, it is the radius of a tool structure on which the antenna is disposed with the tool structure having a cylindrical shape.

All of the dipoles in these arrangements can be of approximately equal strength. CONFIG 1 and CONFIG 2 provide just two examples of different arrangements that can be used to obtain deep high-order azimuthal sensitivity, as described herein. After reading and understanding the content of this disclosure, one of ordinary skill in the art will understand that modifications can be made to the example configurations, including changing the antenna position, antenna orientation, and dipole strength, to achieve similar results.

In many embodiments, tool operation makes use of a combination of multiple (N) high order azimuthal modes $\{n_1, n_2, \ldots n_N\}$. See, for example, FIG. 2, which indicates how to achieve azimuthal resolution by combining modes. In an example embodiment, a superposition of arrangements in FIG. 5 with different modes n can be used as the antenna arrangement. Moreover, two or more ($N_\phi$) different azimuthal phases for the same mode can be used to diversify the information received. By azimuthal phase, it is meant that the same mode measurement is taken with the tool, rotating both transmitter and receiver. This rotation may be applied by physically rotating the tool, or by providing a separate set of antennas for the second phase. Providing a separate set of antennas for the second phase may almost double the total number of antennas.

Multiple phases can be useful in azimuthal focusing of the signal. The total number of antennas in this case will be a sum of the number of antennas for all $n=\{n_1, n_2, \ldots n_N\}$ times $N_\phi$ minus the antennas that can be shared between different modes and phases.

Multi-pole excitation may achieved by introducing azimuthal variation for a single antenna. An example of such variation includes varying the density of windings azimuthally on a toroid. In this case, a single antenna may be adequate to create higher order azimuthal modes. Thus, in some embodiments, transmitting antennas and receiving antennas are arranged to excite or receive a combination of multi-pole excitation modes. In addition, multi-pole excitation may be achieved by subtracting the signal from a secondary transmitter at a different axial position (e.g., via bucking) for reducing unwanted mode contributions, including those arising from the direct signal between a given transmitter and receiver. The concept of bucking is well known to those of ordinary skill in the art and will not be discussed here.

A second pre-processing approach for a system can include taking the ratio of signals from two different receivers that obtain information from the same mode. By taking the ratio, the effect of electronics drift and tool body interference may be reduced or eliminated. This approach can be applied to embodiments of a system of multi-pole antennas in an induction system to provide polarization focusing. The use of either the bucking approach or the ratio approach may double the number of antennas used in the system.

FIG. 6A illustrates an embodiment of an example a multi-pole induction tool 905 via individually controlled coils. The tool 905 can be used in a system identical to or similar to system 300 of FIG. 3. Transmitters Trx and receivers Rcv may be disposed in the same or different boreholes, on the same or different tools 905 (e.g., a transmitter Trx on a first tool 905 in a first borehole, paired with a receiver Rcv on a second tool 905 in a second borehole), to implement cross-well imaging. FIG. 6B shows a top down view of the individual coils around the circumference of the multi-pole induction tool of FIG. 6A. The polarity of these coils can be electrically controlled. FIG. 6C shows, in table form, an embodiment of example excitation polarities used for different modes to apply to the coils of the multi-pole induction tool 905. The label M refers to mode and the label P refers to phase. The labels M and P are used in various of the figures associated with a transmitting antenna (Trx) and a receiving antenna (Rcv). As mentioned above, P can be limited to phase 1 or phase 2 to remove azimuthal ambiguity in the spatial domain of the measurements. Though FIGS. 6B and 6C show 24 antennas in the tool, the tool may have more or less than 24 antennas.

All antennas of the tool can be activated at the same time and with the same frequency. However, they can also be activated at different times and with different frequencies, then synthetically summed in a processing unit. In one approach, all modes (the whole table) can be excited at the same time with the same frequency, using the scaling K given in equation (2), below. This first approach can physically produce a directionally sensitive system. In a second approach, all modes (the whole table) can be excited at the same time with different frequencies and arbitrary scaling. In processing, all modes with multipliers provided by K given in equation (2) can be summed. This second approach synthetically produces a directionally sensitive system. In a third approach, each mode (two rows of the table) can be excited at different times with arbitrary frequencies and with arbitrary scaling. In processing, all modes with multipliers provided by K given in equation (2) can be summed. This approach synthetically produces a directionally sensitive system.

Figures 7A, 7B, 7C:
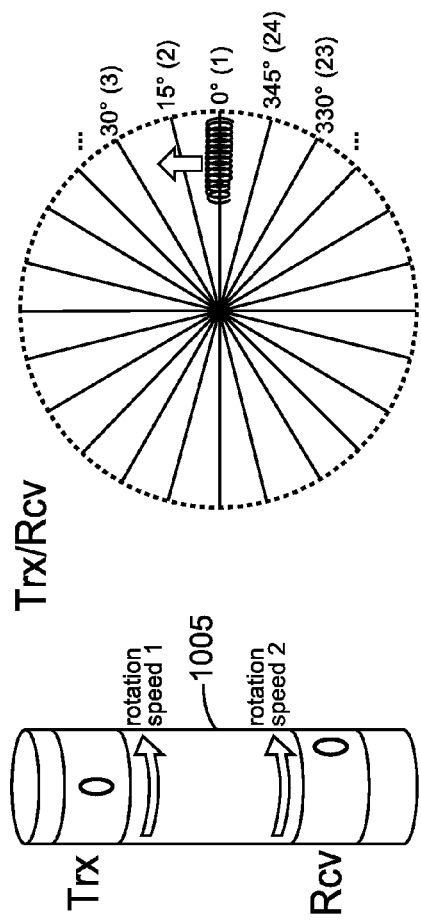
FIG. 7A illustrates an embodiment of an example a multi-pole induction tool that uses rotating coils, in accordance with various embodiments.
FIG. 7B shows a top down view of the individual coil of FIG. 7A as it is rotated around the circumference of the multi-pole induction tool, in accordance with various embodiments.
FIG. 7C shows, in table form, example excitation polarities used for different modes to apply to the coils of the multi-pole induction tool at different angular positions, in accordance with various embodiments.

FIG. 7A illustrates an embodiment of an example multi-pole induction tool that uses rotating coils. The tool 1005 can be used in a system identical to or similar to system 300 of FIG. 3. Transmitters Trx and receivers Rcv may be disposed in the same or different boreholes, on the same or different tools 1005 (e.g., a transmitter Trx on a first tool 1005 in a first borehole, paired with a receiver Rcv on a second tool 1005 in a second borehole), to implement cross-well imaging. FIG. 7B shows a top down view of the individual coil as it is rotated around the circumference of the multi-pole induction tool 1005 of FIG. 7A. The polarity of this coil can be electrically controlled. The polarity of the coil can be selected according to its position as it rotates around an axis of the tool 1005. Though FIG. 7B only shows one coil being rotated, both the transmitter coil and the receiver coil can be rotated. The coils can be rotated at the same rotation rate. Alternatively, the transmitter coil can be rotated with a first rotation speed and the receiver coil can be rotated with a second rotation speed, where the first rotation speed is different from the second rotation speed. With the transmitter and receiver rotate, the tool sonde can be held stationary.

FIG. 7C shows, in table form, an embodiment of example excitation polarities used for different modes to apply to the coils of the multi-pole induction tool at different angular positions around the circumference of the tool structure on which the coil is mounted. This table applies when the transmitter and receiver antennas are disposed in the same borehole.

The label M refers to mode and the label P refers to phase. The labels M and P are used with each transmitting antenna (Trx) and each receiving antenna (Rev). As mentioned above, P can be limited to phase 1 or phase 2 to remove azimuthal ambiguity in the spatial domain of the measurements. Though FIGS. 7B and 7C show 24 angular positions in the tool, the coil of the tool may be rotated to more or less than 24 angular positions.

In the multi-pole induction tool implemented via rotating coils, the tool may be operated using only a single transmitter antenna and single receiver antenna. This embodiment can be realized by having only one transmitter and one receiver disposed in one or more stations. Alternatively, the single transmitter and single receiver architecture can be realized with a number of transmitter antennas and a number of receiver antennas in which only one transmitter antenna is activated to transmit and only one receiver antenna is activated to acquire a signal in response to the transmission. The process of making a measurement will now be described.

The upper antenna housing is rotated to a first direction i. The lower antenna housing can be rotated to a second direction j. Measurement $M_{ij}$ can be obtained with the two antenna antennas at these positions. This dual-rotation and measurement process can be repeated for all i=1 . . . N, j= 1 . . . N. To obtain a result for a particular mode, a summation can be performed according to the operation $$\Sigma(M_{ij} \times S_{ti} \times S_{rj}),$$

where $S_{ti}$ is the sign (+1 or −1) of the transmitter associated with the mode, $S_{rj}$ is the sign (+1 or −1) of the receiver associated with the mode. A hybrid of a multi-pole induction tool via individually controlled coils and multi-pole induction tool via rotating coils can be implemented by placing multiple antennas in the upper housing and multiple antennas in the lower housing and operating the hybrid using excitations similar to those in FIGS. 6C and 7C.

As shown in FIG. 7A, in some embodiments, two sections of a single tool body may rotate, with one or more transmitters attached to the first section, and one or more receivers attached to the second section. The two sections can rotate at different speeds. When making measurements, different rotation angles can be defined, as noted previously, and shown in the figure. From 0 to 360 degrees, different positions and different bins in which to deposit the resulting measurements can be defined, in the same way for both the transmitters and the receivers. In some embodiments, the transmitters and receivers are initially placed in the first position, then a measurement is taken. Next, the receiver is moved to a second position, with the transmitter remaining in the first position, and another measurement is made. To continue the process, the receiver is rotated to each of its positions while the transmitter remains in the first position, and measurement are made at each of the receiver positions. This provides a total of 24 measurements for each transmitter position. Next, the transmitter is moved to the second position, and the receiver is rotated through all of the receiver positions, with measurements again being taken at each receiver position. This process is continued to ultimately yield measurements for all combinations of transmitter and receiver positions.

In order to synthesize the desired multi-pole response from the dipole responses at different transmitter and receiver positions, different combinations of these measurements are used as shown in the table of FIG. 7C. For example, the first two rows show the polarities of the transmitter and receivers that are used to create the second mode (M2). After multiplying the polarity with the response of the associated transmitter receiver response, all 24 results are summed to provide the corresponding multi-pole measurement. It should be noted that number of terms in this sum can be reduced as long as the resulting multi-pole sensitivity pattern is not affected.

Figure 8A:
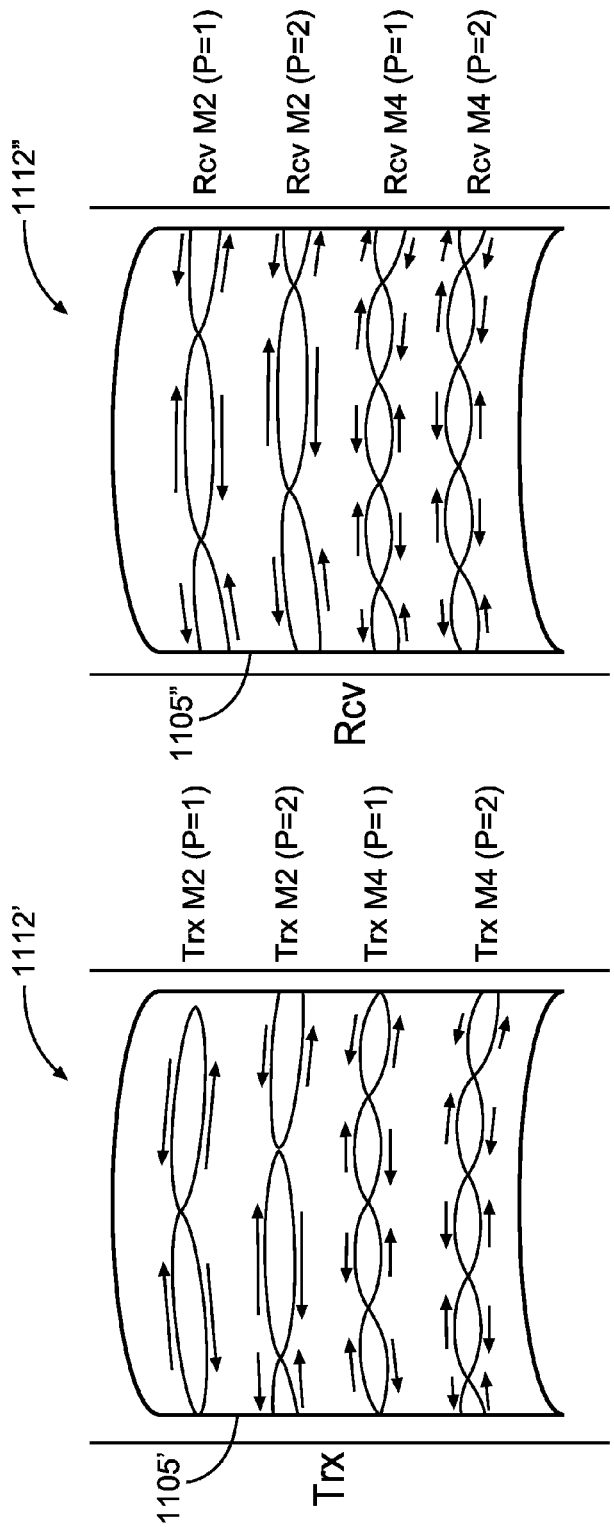
FIG. 8A illustrates an example a multi-pole induction tool via periodic wrapping, in accordance with various embodiments.

FIG. 8A illustrates an embodiment of an example a multi-pole induction tool 1105 via periodic wrapping. The tool 1105 can be used in a system identical to or similar to system 300 of FIG. 3. The wrappings around the tool can be arranged as periodic structures on the surface of the tool structure on which the wrapping antennas are mounted. The periodic wrapping can include a transmitter wire and a receiver wire operatively controlled as a pair. Each periodic wrapping disposed around the tool structure can include a first portion and a second portion, where the second portion is directed azimuthally back towards the first portion such that in operation current flows in a same azimuthal direction in the first portion and in the second portion. The current flow is shown by the arrows in FIG. 8A.

The view in FIG. 8A shows a cylindrical tool surface that has been opened after being sectioned in the axial direction. In operation, the right side of tool 1105 is connected to the left side of tool 1105. Periodicity can be provided as a wrapping path extending above, below, or above and below a plane perpendicular to the longitudinal axis of the tool structure of tool 1105. As the wrapping is disposed azimuthally around tool 1105, its position in the z-direction along the axis of tool 1105 varies periodically. The periodic variation is subject to manufacturing tolerances.

The tool 1105 structure is not limited to a cylindrical one. Though sinusoidal wrapping shapes are shown in FIG. 8A, shapes other than sinusoidal can be used, such as triangular, rectangular, or other periodic structure.

Figure 8B:
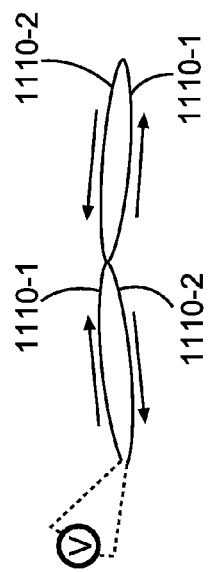
FIG. 8B shows an example periodic wrapping coupled to an excitation source, which can be used on the tool of FIG. 8A, in accordance with various embodiments.

FIG. 8B shows an example periodic wrapping coupled to an excitation source V, which can be used on the tool of FIG. 8A. The periodic wrapping can include first portion 1110-1 and a second portion 1110-2, where the second portion 1110-2 can be directed azimuthally back towards the first portion 1110-1 such that in operation current flows in a same azimuthal direction in the first portion 1110-1 and in the second portion 1110-2.

As is the case in FIG. 8A, the view in FIG. 8B illustrates the open tool surface after axial separation. With the wrappings disposed on operable tool 1105, the right end shown in FIG. 8B almost touches the left end shown in FIG. 8B. With the right end moved to almost touch the left end, it can be seen that the current flows in the same azimuthal direction, as the current arrows align. The example wrapping of FIG. 8B can be realized as a single continuous wire. The second portion 1110-2 can be shifted 180° from the first portion 1110-1 with respect to the tool structure. Alternatively, each winding can be composed of multiple wires. Multiple wire segments can be concatenated to provide effectively a single continuous wire.

A multi-pole induction tool 1105 that implements periodic wrapping can form part of a system with a control unit operatively coupled to the transmitter wire and to the receiver wire to selectively activate transmission from the transmitter wire and to selectively activate acquisition of a signal at the receiver wire in response to the transmission. The multi-pole induction tool via periodic wrapping can include two periodic wrappings on the tool structure 1105, each of the two periodic wrappings having a period different from each other. In another embodiment, the multi-pole induction tool via periodic wrapping can include a plurality of transmitter wires and a plurality of receiver wires operatively controlled as pairs, with each transmitter wire and each receiver wire disposed as a periodic wrapping around the tool structure. Each periodic wrapping can include a first portion and a second portion, with the second portion directed azimuthally back towards the first portion such that in operation current flows in a same azimuthal direction in the first portion and in the second portion. In the plurality of transmitter wires and the plurality of receiver wires, each transmitter periodic wrapping can have a period equal to a period of a receiver periodic wrapping to which it is operatively paired, where at least one pair having a period different from another pair in the plurality.

The control unit can be structured to be operable to selectively activate a transmitter wire and a receiver wire having the same periodicity of wrapping. The control unit can be structured to be operable to control the plurality of transmitter wires and the plurality of receiver wires as a plurality of transmitter—receiver pairs, the transmitter and the receiver of each transmitter—receiver pair having the same periodicity of wrapping. The transmitter wires and the receiver wires can be selectively controlled on a pair-wise basis.

Pairings of transmitters and receivers can extend across boreholes in some embodiments that implement cross-well tomographic imaging. Thus, a multi-pole induction tool 1105 that implements periodic wrapping can form part of a system with a control unit operatively coupled to the transmitter wire attached to a first tool in a first borehole, and to a receiver wire attached to a receiver wire on a second tool in a second borehole, to selectively activate transmission from the transmitter wire and to selectively activate acquisition of a signal at the receiver wire in response to the transmission. In this way, a transmitter wrapping on a first tool disposed in a first borehole may be operatively paired with a receiver wrapping on a second tool disposed in a second borehole.

The transmitter wires of a multi-pole induction tool can be disposed along a longitudinal axis of the tool structure in a sequential manner with respect to the periodicity of each transmitter. In addition, the receiver wires can be disposed along the longitudinal axis of the tool structure in a sequential manner with respect to the periodicity of each receiver. The sequential manner for both the transmitter wires and the receiver wires can be arranged from a largest period to a smallest period ordered by period size. In some embodiments, the transmitter wires are disposed on a first tool in a first borehole, and the receiver wires are disposed on a second tool in a second borehole.

Figure 8C:
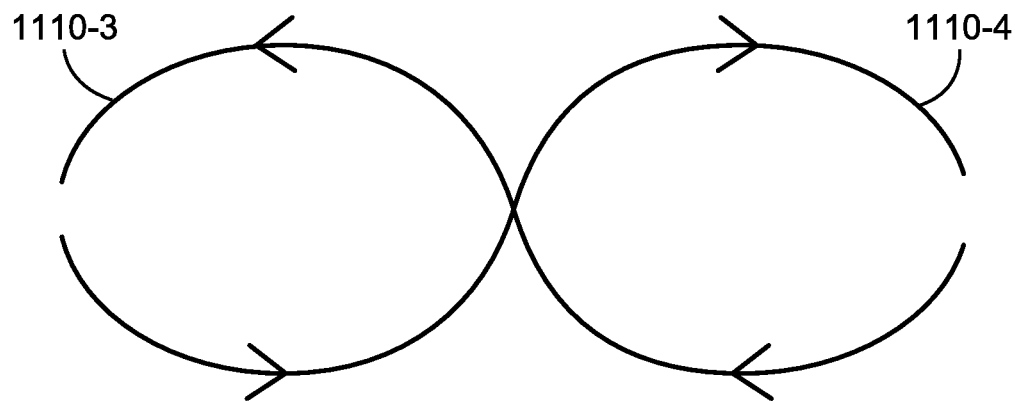
FIGS. 8C-8D show example periodic wrappings that can be used on the tool of FIG. 8A, in accordance with various embodiments.

FIG. 8C shows an example periodic wrapping, which can be used on the tool of FIG. 8A. FIG. 8C shows a construction with the first portion 1110-3 and the second portion 1110-4 structured as separate wires. The first portion 1110-3 can have two ends to couple to a first source and the second portion 1110-4 can have two ends to couple to a second source. The second portion 1110-4 can be 180° shifted from the first portion 1110-3 with respect to the tool structure.

Figure 8D:
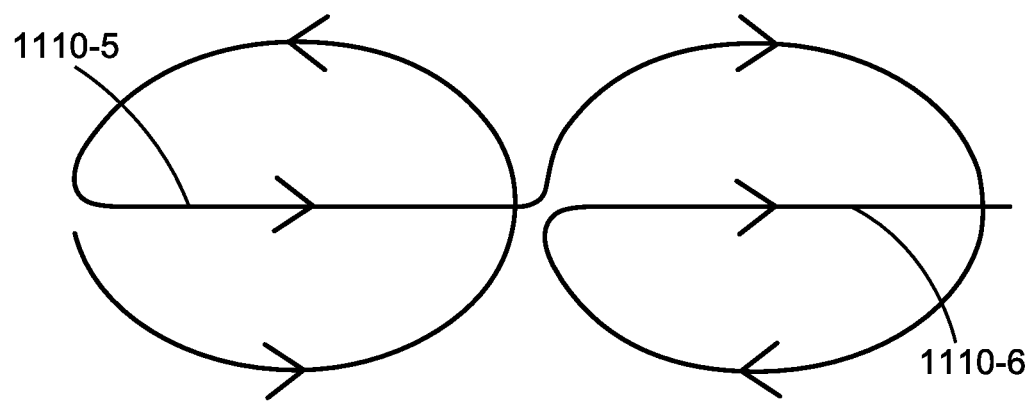

FIG. 8D shows another example periodic wrapping, which can be used on the tool of FIG. 8A. FIG. 8C shows a construction in which a periodic wrapping can include wiring 1110-5 and 1110-6 internal to the tool structure 1105.

The number of transmitting antennas and the number of receiving antennas structured as periodic wrappings, as shown in FIG. 8A, can be arranged to generate deep high-order azimuthal sensitivity. However, the structure of wrapping can be used in applications different from generating deep high-order azimuthal sensitivity. The periodic wrapping structure can be used in geosteering, mapping formation profile around a borehole, conducting a stress analysis around the borehole, or other downhole functions, including cross-well tomographic imaging.

Figure 9:
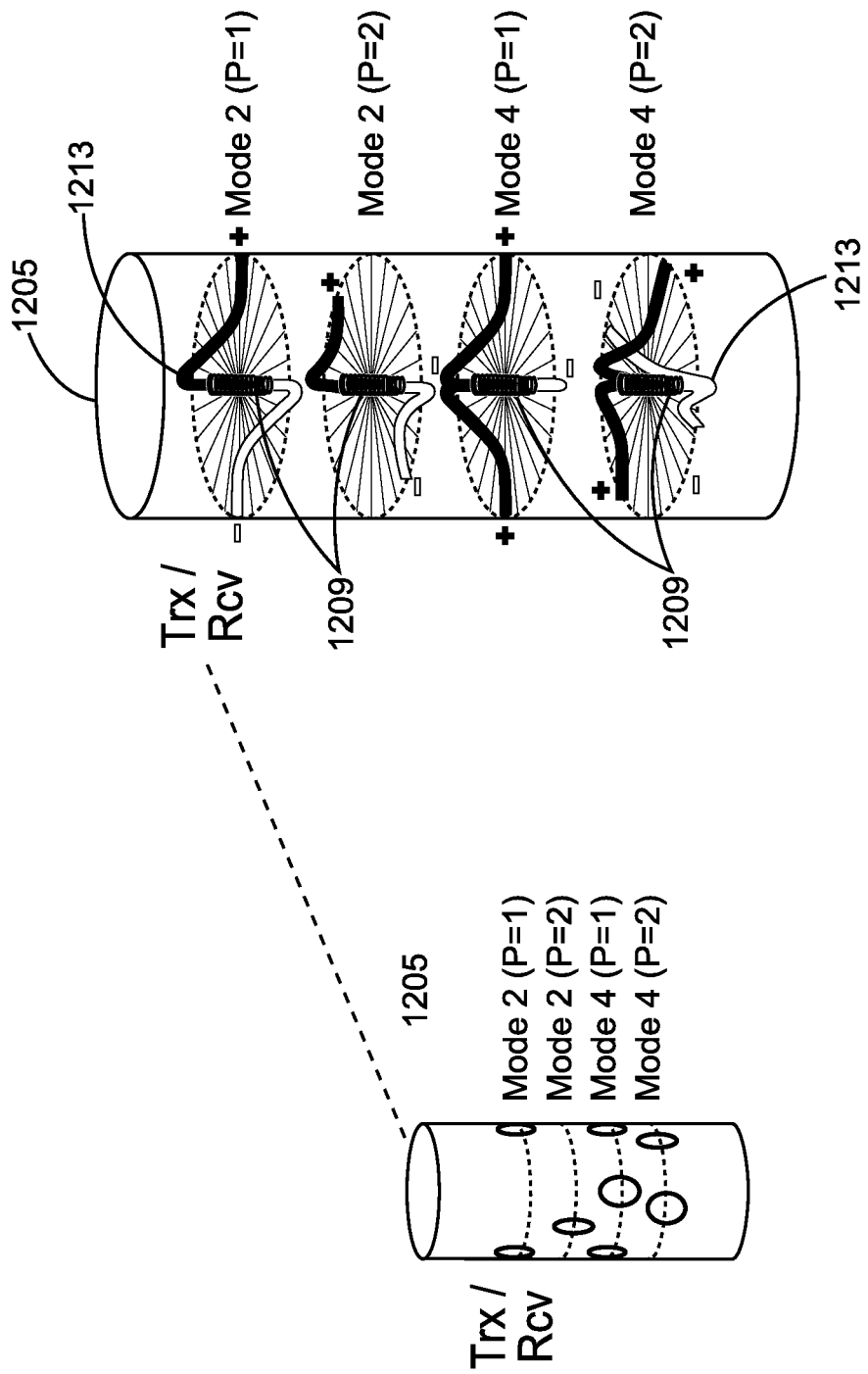
FIG. 9 illustrates an embodiment of an example a multi-pole induction tool via guided flux, in accordance with various embodiments.

FIG. 9 illustrates an embodiment of an example a multi-pole induction tool 1205 via guided flux. The tool 1205 can be used in a system identical to or similar to system 300 of FIG. 3. Transmitters Trx and receivers Rcv may be disposed in the same or different boreholes, on the same or different tools 1205 (e.g., a transmitter Trx on a first tool 1205 in a first borehole, paired with a receiver Rcv on a second tool 1205 in a second borehole), to implement cross-well imaging. Coils 1209 with a high permeability core 1213 can be used to achieve high mode numbers and balancing. Depending on the dipole direction or position for a mode N that is of interested in, a high permeability core can be placed that opens outside at particular locations.

Figure 10:
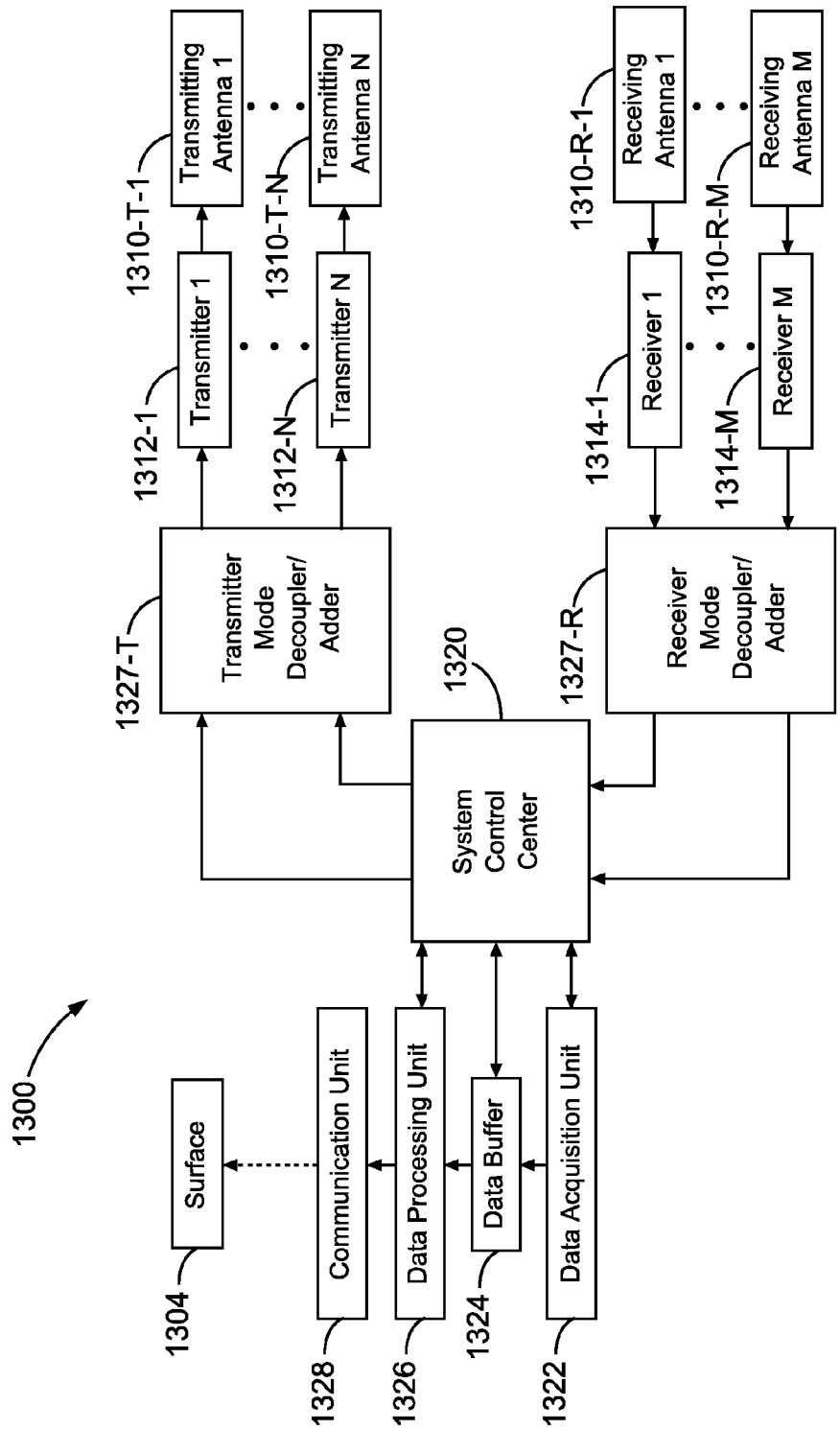
FIG. 10 shows a block diagram of an embodiment of a data acquisition system, in accordance with various embodiments.

FIG. 10 shows a block diagram of an embodiment of a system 1300, such as a data acquisition system, having a tool operable as a sensing system to provide polarization focusing with transmitting antennas 1310-T-1 . . . 1310-T-N and receiving antennas 1310-R-1 . . . 1310-R-M, operable in a borehole in which the tool is placed. System 1300 can include a system control center 1320, transmitters 1312-1 . . . 1312-N, receivers 1314-1 . . . 1314-M, a data acquisition unit 1322, a data buffer 1324, a data processing unit 1326, and a communication unit 1328 in addition to the tool with transmitting antennas 1310-T-1 . . . 1310-T-N and receiving antennas 1310-R-1 . . . 1310-R-M. System control center 1320 can include a central processing unit (CPU), analog electronics, digital electronics, or various combinations thereof to manage operation of other units of system 1300.

System control center 1320 can generate a signal and feed the signal to transmitters 1312-1 . . . 1312-N. The transmitters can be simultaneously or sequentially activated and they can be kept on for a time long enough to allow transients to die off and noise effects to diminish via stacking. The received signals can be transformed into a domain where the incident portion of the signal can be separated from the reflected portion. The signals at the receivers are provided to system control center 1320, which can be stored at the data buffer 1324 before finally being communicated to the surface 1304.

System control center 1320 selectively activates the transmitting antennas 1310-T-1 . . . 1310-T-N and selectively receives the signal scattered from the formation at the receiving antennas 1310-R-1 . . . 1310-R-M. A mode decoupler can be used to ensure mode purity by separating different modes, to reduce the number of mixed modes. A mode adder can be used to produce a combination of modes that has directional azimuthal sensitivity, such as that shown in FIG. 2.

Due to reciprocity, a transmitter mode decoupler/adder 1327-T can be applied to the transmitted signal, and a receiver mode decoupler/adder 1327-R can be applied to the received signal. Signals may be coupled and decoupled at the mode decoupler, via signal addition. A signal with a certain transient or periodic signature is generated by the transmitting source. The mode adder can be used for the transmitting antennas 1310-T-1 . . . 1310-T-N to combine dipole responses, producing a multi-pole response by transmitting multiple modes simultaneously. The mode decoupler can help separate different modes from each other to present pure modes, helping to prevent one transmitted mode from bleeding into another. The receiver mode decoupler takes signals from the receivers 1314-1 . . . 1314-M to decouple the modes combined by the transmitter mode decoupler. A mode adder can also be used with the received signal to produce directional or high order azimuthal modes.

The receiver system operation may or may not be synchronized with the source activation. Synchronization may allow better control on the phase of the received signal if no ratios are being used in processing. A received transient signal can be digitized and recorded as a function of time, and it can be later converted to frequency with a Fourier transform operation. It can be alternatively passed through an analog band-passed filter so that only the response at a discrete set of frequencies is recorded. The signal received by the receivers can be stored in the data buffer 1324, processed, and if necessary, communicated to the surface.

Electromagnetic wave signals that are received at receiving antennas 1310-R-1 . . . 1310-R-M can be directed to corresponding receivers 1314-1 . . . 1314-M and system control center 1320. Operation of apparatus 1300 can include multiple frequencies being transmitted and received at the same time for better time utilization. In such an operation, a sinusoidal waveform, a square waveform, or other time-based waveforms may be used to excite multiple frequencies simultaneously at each transmitting antenna 1310-T-1 . . . 1310-T-N or individual frequencies at transmitter antennas 1310-T-1 . . . 1310-T-M. Received signals corresponding to the multiple frequencies can be separated by filters at the receiving end in data acquisition unit 1322. For each transmitting antenna 1310-T-1 . . . 1310-T-N, received signals at all receivers 1314-1 . . . 1314-M can be recorded. Data buffer 1324 can be used to store received signal for processing.

In some embodiments, such as those used to provide cross-well tomographic imaging, the transmitting antennas 1310-T-1 . . . 1310-T-N are attached to a first hole disposed in a first borehole, and the receiving antennas 1310-R-1 . . . 1310-R-M are attached to a second tool disposed in a second borehole. In some embodiments, the transmitting antennas 1310-T-1 . . . 1310-T-N are divided between boreholes, so that at least some are attached to a first tool disposed in a first borehole, and at least some are attached to a second tool disposed in a second borehole. The remainder of the transmitting antennas 1310-T-1 . . . 1310-T-N, if any, may be attached to other tools in other boreholes. Similarly, the receiving antennas 1310-R-1 . . . 1310-R-M may be divided between boreholes, so that so that at least some of the receiving antennas 1310-R-1 . . . 1310-R-M are attached to either one or both of the first tool disposed in the first borehole, and the second tool disposed in the second borehole. Remaining ones of the receiving antennas 1310-R-1 . . . 1310-R-M, if any, may be may be attached to other tools in other boreholes.

Data processing unit 1326 can be used to perform inversion or other processing on the data. The processing and the inversion can be continued in accordance with processing features similar to or identical to embodiments taught herein. Inversion operations can include a comparison of measurements to predictions of a model such that a value or spatial variation of a physical property can be determined. A conventional inversion operation can include determining a variation of electrical conductivity in a formation from measurements of induced electric and magnetic fields. Other techniques, such as a forward model, deal with calculating expected observed values with respect to an assumed model. In various embodiments, an inversion process, conducted with respect to apparatus 1300, may be performed downhole or in an analysis unit, such as a computer, at surface 1304 after the data is transferred to surface 1304. Communication unit 1328 can communicate the data or results to surface 1304 for observation and/or determination of subsequent action to be taken in a drilling operation related to the measurements taken with apparatus 1300. The data or results may also be communicated to other tools downhole and used to improve various aspects of locating and extracting hydrocarbons.

Figure 11:
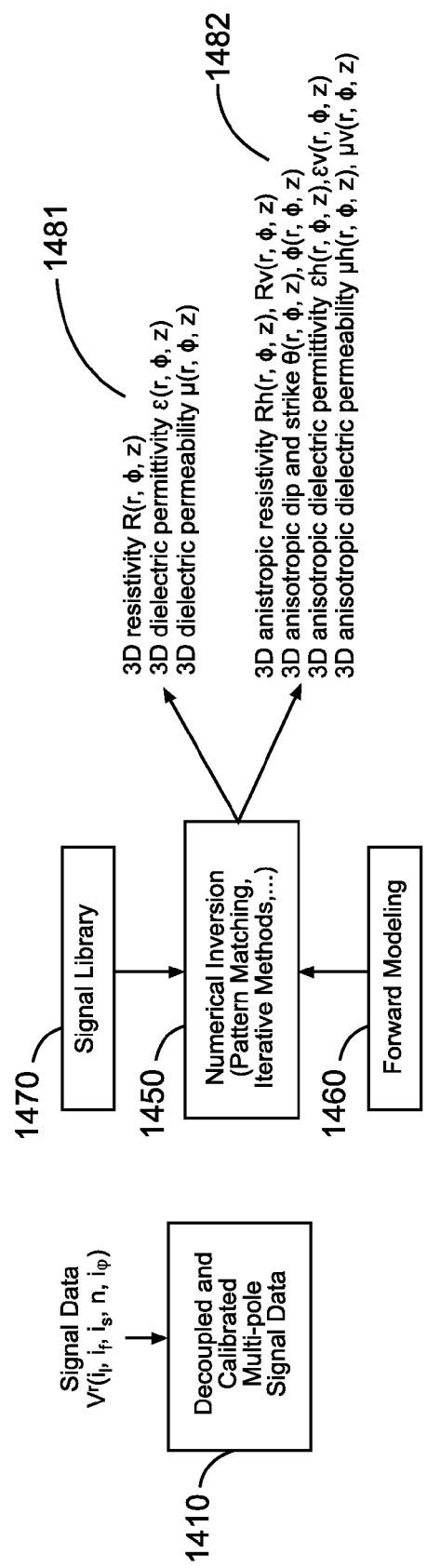
FIG. 11 shows an example processing methodology, in accordance with various embodiments.

FIG. 11 shows an embodiment of an example processing methodology. The signal obtained at the receivers are decoupled into different azimuthal modes and calibrated to remove effects of electronics drift or amplification, at 1410, where $V^r$ is the received signal voltage, $i_l$ is the logging depth index, $i_f$ is the frequency index, $i_s$ is the spacing index, n is the mode index (e.g., 1 to 8 or 1 to 10), and $i_\phi$ is the mode azimuth index (e.g., 1 or 2).

Radial and axial focusing can be implemented using software focusing methods that are well known to those of ordinary skill in the art of standard array induction tools. Software focusing works best in a tool operating regime where skin depth can be ignored or significantly reduced/eliminated. A software focusing method can include generating probe signals and making measurements at selected locations, using linearity of the measuring environment to determine quantities being measured from known relationships between the generated entity (for example, a current or voltage to excite a transmitter) and measured property (for example, voltage at a receiver) in the measuring environment. In cases where linearity is not satisfied, a forced inversion, at 1450, can be implemented used a library, at 1470, or iterations with a forward modeling method, at 1460. Inversion can include pattern matching, iterative methods, or other inversion techniques.

Inversion methods for induction tools are well known to those of ordinary skill in the art, and are therefore not discussed further herein. The order of focusing and inversion operations in FIG. 11 can be interchanged based on the methodology that is chosen for use.

The outputs of the focusing and inversion algorithm can be different in different type of applications of embodiments of a multi-pole tool. In a more general case, a 3D profile of resistivity $R(r, \phi, z)$, dielectric permittivity $\in(r, \phi, z)$, and dielectric permeability $\mu(r, \phi, z)$ can be obtained, as shown at 1481. In anisotropic formations, 3D horizontal and vertical properties of the formation such as anisotropic resistivity $Rh(r, \phi, z)$, $Rv(r, \phi, z)$, anisotropic dielectric permittivity $\in h(r, \phi, z)$, $\in v(r, \phi, z)$, anisotropic dielectric permeability μh(r, φ, z), μv(r, φ, z), and anisotropic dip and strike θ(r, φ, z), φ(r, φ, z) can be separately obtained, at 1482. This general 3D profiling may use a large number of transmitter/receivers to achieve the desired radial resolution.

In various embodiments, a system can comprise: a number of transmitting antennas arranged on a tool structure; a number of receiving antennas arranged on the tool structure, the receiving antenna operable to acquire a signal in response to selective activation of the number of transmitting antennas, such that the number of transmitting antennas, the number of receiving antennas, or both the number of transmitting antennas and the number of receiving antennas include one or more antennas structured as a multi-pole antenna, and the number of transmitting antennas and the number of receiving antennas can be arranged to generate deep high-order azimuthal sensitivity; and a control unit arranged to control the selective activation of the number of transmitting antennas and to acquire signals selectively from the number of receiving antennas in response to the selective activation. In any of the systems described herein, transmitters and receivers may be attached to the same tool and disposed in a single borehole, or distributed to be attached to one or more tools, and disposed in multiple boreholes, in various embodiments.

The number of transmitting antennas can include one or more multi-pole transmitter antennas and the number of receiving antennas can include one or more multi-pole receiver antennas, the one or more multi-pole transmitter antennas and the one or more multi-pole receiver antennas arranged to generate deep high-order azimuthal sensitivity. In addition, the number of transmitting antennas and the number of receiving antennas can be arranged to establish deep high-order azimuthal sensitivity by using a combination of magnetic dipoles. The number of transmitting antennas and the number of receiving antennas can be arranged to establish deep azimuthal focusing by using a combination of deep high-order azimuthal sensitivity modes.

The number of transmitting antennas or the number of receiving antennas can have an arrangement of n dipole antennas, such that placement of the n dipole antennas with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by:

$$r_i = a \qquad r_i = a$$
$$\phi_i = (4i-3)\frac{90}{n} \quad \text{or} \quad \phi_i = (4i-5)\frac{90}{n}$$
$$\hat{u}_i = -(-1)^i \hat{\rho} \qquad \hat{u}_i = -(-1)^i \hat{\rho}$$

with $r_i$, $\phi_i$ and $u_i$, denoting the radial position of the $i^{th}$ dipole, the angular position of the $i^{th}$ dipole in degrees, and the orientation vector of the $i^{th}$ dipole, respectively, and with a being the distance from the axis at which the transmitting dipole antennas and the receiving dipole antennas are disposed.

In another example system, the number of transmitting antennas or the number of receiving antennas arranged to generate deep high-order azimuthal sensitivity can include a transmitter wire and a receiver wire operatively controlled as a pair, each of the transmitter wire and the receiver wire disposed as a periodic wrapping around the tool structure in the same or different boreholes, each periodic wrapping including a first portion and a second portion, the second portion directed azimuthally back towards the first portion such that in operation current flows in a same azimuthal direction in the first portion and in the second portion. The periodic wrapping can be arranged as a single wire having two ends to couple to a source, the second portion being 180° shifted from the first portion with respect to the tool structure. The single wire can include wire segments that are concatenated. The first portion and the second portion can be separate wires, the first portion having two ends to couple to a first source and the second portion having two ends to couple to a second source, the second portion being 180° shifted from the first portion with respect to the tool structure. Each periodic wrapping can include wiring internal to the tool structure. The periodic wrapping, including internal wiring, can be arranged as a single wire having two ends.

The example system can include two periodic wrappings on the tool structure, each of the two periodic wrappings having a period different from each other. The example system can include a plurality of transmitter wires and a plurality of receiver wires operatively controlled as pairs, each transmitter wire and each receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion, each transmitter periodic wrapping having a period equal to a period of a receiver periodic wrapping to which it is operatively paired, at least one pair having a period different from another pair. The transmitter wires can be disposed along a longitudinal axis of the tool structure in a sequential manner with respect to the period of each transmitter, and the receiver wires can be disposed along the longitudinal axis of the tool structure in a sequential manner with respect to the period of each receiver in the same or a different borehole. The sequential manner for both the transmitter wires and the receiver wires can be from a largest period to a smallest period ordered by period size. The periodic wrapping of the transmitter wire can be sinusoidal, triangular, or rectangular.

The example system can include a data processing unit operable with the control unit such that from generation of a number of high-order azimuthal sensitivity modes, the data processing unit can be structured to synthetically sum the high-order azimuthal sensitivity modes to establish azimuthal focusing. The example system can include a mode adder operable with the control unit such that from generation of a number of high-order azimuthal sensitivity modes, the mode adder can be structured to sum the high-order azimuthal sensitivity modes to establish azimuthal focusing.

In a second example system, the number of transmitting antennas and the number of receiving antennas arranged to generate high-order azimuthal sensitivity can include multiple dipole antennas having controlled polarity, the control unit arranged to selectively control the polarity of the multiple dipole antennas. The transmitting antennas of the multiple dipole antennas can be arranged in a transmitter with each transmitting antenna at a different angular position around a circumference of the tool structure, the transmitter disposed in an array of transmitters. A multiple dipole antenna operable as one of the receiving antennas can be arranged as a receiver in an array of receivers. In an embodiment, the receiver can have multiple dipole antennas operable as receiving antennas with each receiving antenna of the receiver at a different angular position around a circumference of the tool structure with respect to the other receiving antennas in the receiver. The transmitter and the receiver can be disposed in multiple boreholes to operatively provide a variety of three-dimensional coverage of the volume of investigation.

The number of transmitting antennas can include magnetic dipoles selected from a group including coils and solenoids or the number of transmitting antennas can include electric dipoles selected from a group including wire antennas and toroids. The transmitting antennas can include a toroid having windings such that a density of the windings is varied azimuthally on the toroid.

The second example system can include a data processing unit operable with the control unit such that from generation of a number of high-order azimuthal sensitivity modes, the data processing unit can be structured to synthetically sum the high-order azimuthal sensitivity modes to establish azimuthal focusing. The second example system can include a mode adder operable with the control unit such that from generation of a number of high-order azimuthal sensitivity modes, the mode adder can be structured to sum the high-order azimuthal sensitivity modes to establish azimuthal focusing.

In a third example system, the number of transmitting antennas and the number of receiving antennas arranged to generate high-order azimuthal sensitivity can include multiple dipole antennas operable under controlled rotation by the control unit. One or more of the multiple dipole antennas can be operable as transmitting antennas attached to a housing and disposed in a borehole different from one or more of the multiple dipole antennas operable as the receiving antennas. The control unit can be operable to rotate one or more of the multiple dipole antennas operable as transmitting antennas at a rotation speed different from a rotation speed of one or more of the multiple dipole antennas operable as receiving antenna. In an embodiment, only one of the multiple dipole antennas is operated as a rotating transmitter antenna. The third example system can include a data processing unit operable with the control unit such that from generation of a number of high-order azimuthal sensitivity modes, the data processing unit can be structured to synthetically sum the high-order azimuthal sensitivity modes to establish deep azimuthal focusing. The third example system can include a mode adder operable with the control unit such that from generation of a number of high-order azimuthal sensitivity modes, the mode adder can be structured to sum the high-order azimuthal sensitivity modes to establish azimuthal focusing.

Various embodiments of a system can include a data processing unit operable to: decouple acquired signals into different azimuthal modes and calibrate the one or more signals, generating decoupled and calibrated signal data; perform azimuthal focusing, radial focusing, axial focusing, and inversion based on the decoupled and calibrated signal data; and generate data related to one or more of the borehole and the formation.

In various embodiments, a method can comprise: activating one or more transmitting antennas of a tool disposed in a borehole to transmit into a formation; selectively acquiring one or more signals at one or more receiving antennas of the tool in response to transmission by the one or more transmitting antennas, wherein the one or more transmitting antennas, the one or more receiving antennas, or both the one or more transmitting antennas and the one or more receiving antennas include one or more antennas structured as a multi-pole antenna; and controlling the activation and the selective acquisition, generating high-order azimuthal sensitivity. The one or more transmitting antennas can include one or more multi-pole transmitter antennas and the one or more receiving antennas can include one or more multi-pole receiver antennas, the one or more multi-pole transmitter antennas and the one or more multi-pole receiver antennas arranged to generate high-order azimuthal sensitivity. Generating high-order azimuthal sensitivity can include establishing the high-order azimuthal sensitivity by using a combination of magnetic dipoles. Generating high-order azimuthal sensitivity includes establishing the high-order azimuthal sensitivity by using a combination of high-order azimuthal sensitivity modes The one or more transmitting antennas and the one or more receiving antennas can have an arrangement of n dipole antennas such that placement of the n dipole antennas with respect to the tool structure, in terms of $\hat{\rho}$, $\hat{\phi}$ and $\hat{z}$ unit vectors in cylindrical coordinates along radial, azimuthal and z-directions with the z-direction being along an axis of the tool structure, is given by:

$$r_i = a \qquad r_i = a$$
$$\phi_i = (4i-3)\frac{90}{n} \quad \text{or} \quad \phi_i = (4i-5)\frac{90}{n}$$
$$\hat{u}_i = -(-1)^i \hat{\rho} \qquad \hat{u}_i = -(-1)^i \hat{\rho}$$

with $r_i$, $\phi_i$ and $u_i$, denoting the radial position of the $i^{th}$ dipole, the angular position of the $i^{th}$ dipole in degrees, and the orientation vector of the $i^{th}$ dipole, respectively, and with a being the distance from the axis at which the transmitting dipole antennas and the receiving dipole antennas are disposed.

In another example method, the one or more transmitting antennas and the one or more receiving antennas arranged to generate the deep high-order azimuthal sensitivity can include a transmitter wire and a receiver wire operatively controlled as a pair, each of the transmitter wire and the receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion. The periodic wrapping can be arranged as a single wire having two ends to couple to a source, the second portion being 180° shifted from the first portion with respect to the tool structure. The first portion and the second portion can be separate wires, the first portion having two ends to couple to a first source and the second portion having two ends to couple to a second source, the second portion being 180° shifted from the first portion with respect to the tool structure. In an embodiment, each periodic wrapping can include wiring internal to the tool structure.

In an embodiment, the one or more transmitting antennas and the one or more receiving antennas can include two periodic wrappings on the tool structure, each of the two periodic wrappings having a period different from each other. In another embodiment, the one or more transmitting antennas and the one or more receiving antennas can include a plurality of transmitter wires and a plurality of receiver wires operatively controlled as pairs, each transmitter wire and each receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion, each transmitter periodic wrapping having a period equal to a period of a receiver periodic wrapping to which it is operatively paired, at least one pair having a period different from another pair.

The example method can include generating a number of deep high-order azimuthal sensitivity modes and synthetically summing the deep high-order azimuthal sensitivity modes to establish deep azimuthal focusing. The example method can include generating a number of deep high-order azimuthal sensitivity modes and summing, using a mode adder, the deep high-order azimuthal sensitivity modes to establish deep azimuthal focusing.

In a second example method, generating deep high-order azimuthal sensitivity can include selectively controlling polarity of multiple dipole antennas. The second example method can include generating a number of deep high-order azimuthal sensitivity modes and synthetically summing the deep high-order azimuthal sensitivity modes to establish deep azimuthal focusing. The second example method can include generating a number of deep high-order azimuthal sensitivity modes and summing, using a mode adder, the deep high-order azimuthal sensitivity modes to establish deep azimuthal focusing.

In a third example method, generating deep high-order azimuthal sensitivity can include controllably rotating a number of multiple dipole antennas. Controllably rotating multiple dipole antennas can include rotating only one transmitter antenna. The third example method can include generating a number of deep high-order azimuthal sensitivity modes and synthetically summing the deep high-order azimuthal sensitivity modes to establish deep azimuthal focusing. The third example method can include generating a number of deep high-order azimuthal sensitivity modes and summing, using a mode adder, the deep high-order azimuthal sensitivity modes to establish deep azimuthal focusing.

Various embodiments of a method can include processing the one or more signals, the processing can include: decoupling one or more signals into different azimuthal modes and calibrating the one or more signals, generating decoupled and calibrated signal data; performing azimuthal focusing, radial focusing, axial focusing, and inversion based on the decoupled and calibrated signal data; and generating data related to one or more of the borehole and the formation from performing the azimuthal focusing, the radial focusing, the axial focusing, and the inversion. Decoupling and calibrating the one or more signals can include: simulating the formation with an impulse resistivity; generating a simulated signal voltage from simulating the formation with the impulse resistivity; and deconvolving a measured signal voltage with the simulated signal voltage.

Various embodiments of a method can include prior to deploying the tool in the borehole, generating and storing, in memory, a mode decoupling and calibration matrix such that the one or more signals can be decoupled and calibrated in operation of the tool in the borehole using the mode decoupling and calibration matrix, the mode decoupling and calibration matrix generated by: operating the tool in a known formation with azimuthal periodicity; making measurements at a selected mode; constructing a response matrix based on the measurements for the selected mode and azimuthal periodicity; and inverting the response matrix.

Different embodiments of systems and methods of operating system, as taught herein, can be combined in a number of arrangements. The combination can include permutations of features of the systems, permutations of features of methods of operating the systems, or permutations of features of the systems and features of methods of operating the systems.

In various embodiments, a machine-readable storage device can have instructions stored thereon, which, when executed by one or more processors of a machine, cause the machine to perform operations, the operations comprising any of the features of methods of making measurements via multi-pole induction and analyzing the measurements in a manner identical to or similar to the methods described herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

In various embodiments, a system can comprise a tool having an array of transmitters and an array of receivers; a control unit operable to manage generation of signals from the array of transmitters and to manage collection of received signals at the array of receivers; and a data processing unit, wherein the tool, the control unit, and the data processing unit are structured to operate according to any of the features of methods of making measurements via multi-pole induction and analyzing the measurements in a manner identical to or similar to the methods described herein. The system can include one or more machine-readable storage devices to implement one or more of these features.

Figure 12:
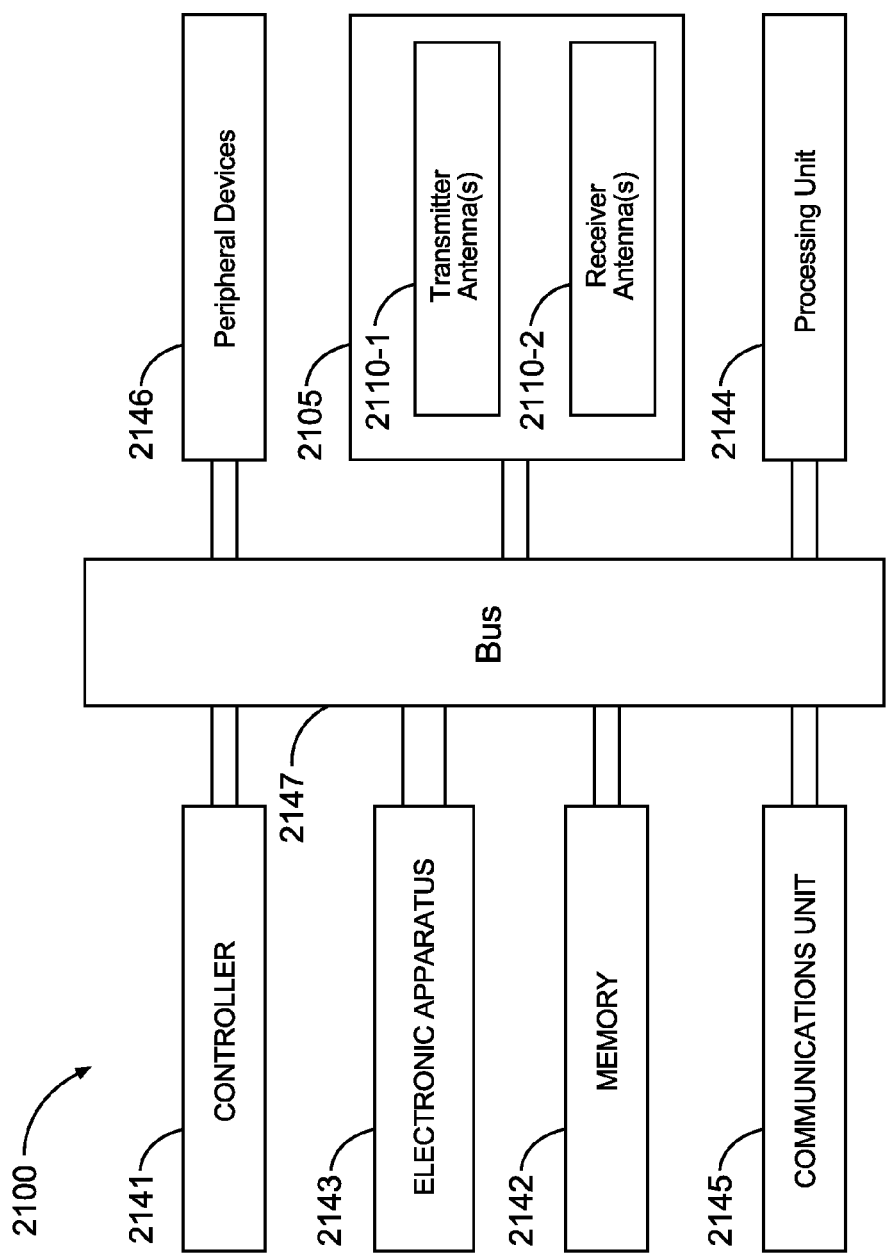
FIG. 12 depicts a block diagram of features of an embodiment of a system including a multi-pole antenna tool, in accordance with various embodiments.

FIG. 12 depicts a block diagram of features of an embodiment of a system 2100 including an antenna tool 2105 having an arrangement of transmitters and receivers operable as a multi-pole induction tool. The arrangements of transmitters 2110-1 and receivers 2110-2 of antenna tool 2105 can be realized similar to or identical to arrangements discussed herein. The arrangements can include one or more transmitter-receiver antenna pairs arranged to be selectively controlled to generate deep high-order azimuthal sensitivity. For example, control of the one or more transmitter-receiver antenna pairs can include, but is not limited to, selective polarity of the transmitter and the receiver in the transmitter-receiver antenna pairs. The tool 2105 may comprise multiple tools, disposed in more than one borehole, with transmitter antennas 2110-1 attached to one or more of the multiple tools, and receiver antennas 2110-2 attached to one or more of the multiple tools, as noted elsewhere herein. Transmitter-receiver pairs may thus be controlled between two or more boreholes, with a transmitter of a designated pair in a first borehole, and a receiver of the designated pair in a second borehole, so that cross-well imaging may be accomplished.

In some embodiments, azimuthal focusing can be realized by applying a synthetic beam sweep to decoupled and calibrated signal data. The results of the synthetic beam sweep can be subjected to deconvolution. Thereafter, inversion can be performed to provide distance mapping, where the inversion can be conducted using inputs of known layer resistivities.

System 2100 can also include a controller 2141, a memory 2142, an electronic apparatus 2143, and a communications unit 2145. Controller 2141, memory 2142, and communications unit 2145 can be arranged to operate antenna tool 2105 as a multi-pole antenna to provide higher order azimuthal modes. Controller 2141, memory 2142, and electronic apparatus 2143 can be realized to control activation of transmitter antennas 2110-1 and selection of receiver antennas 2110-2 in antenna tool 2105 and to manage processing schemes in accordance with measurement procedures and signal processing as described herein. Communications unit 2145 can include downhole communications in a drilling operation. Such downhole communications can include a telemetry system.

System 2100 can also include a bus 2147, where bus 2147 provides electrical conductivity among the components of system 2100. Bus 2147 can include an address bus, a data bus, and a control bus, each independently configured. Bus 2147 can also use common conductive lines for providing one or more of address, data, or control, the use of which can be regulated by controller 2141. Bus 2147 can be configured such that the components of system 2100 are distributed. Such distribution can be arranged between downhole components such as transmitters 2110-1 and receivers 2110-2 of antenna tool 2105 and components that can be disposed on the surface of a well. Alternatively, the components can be co-located such as on one or more collars of a drill string or on a wireline structure.

In various embodiments, peripheral devices 2146 can include displays, additional storage memory, and/or other control devices that may operate in conjunction with controller 2141 and/or memory 2142. In an embodiment, controller 2141 can be realized as one or more processors. Peripheral devices 2146 can be arranged with a display with instructions stored in memory 2142 to implement a user interface to manage the operation of antenna tool 2105 and/or components distributed within system 2100. Such a user interface can be operated in conjunction with communications unit 2145 and bus 2147. Various components of system 2100 can be integrated with antenna tool 2105 such that processing identical to or similar to the processing schemes discussed with respect to various embodiments herein can be performed downhole in the vicinity of the measurement or at the surface.

Figure 13:
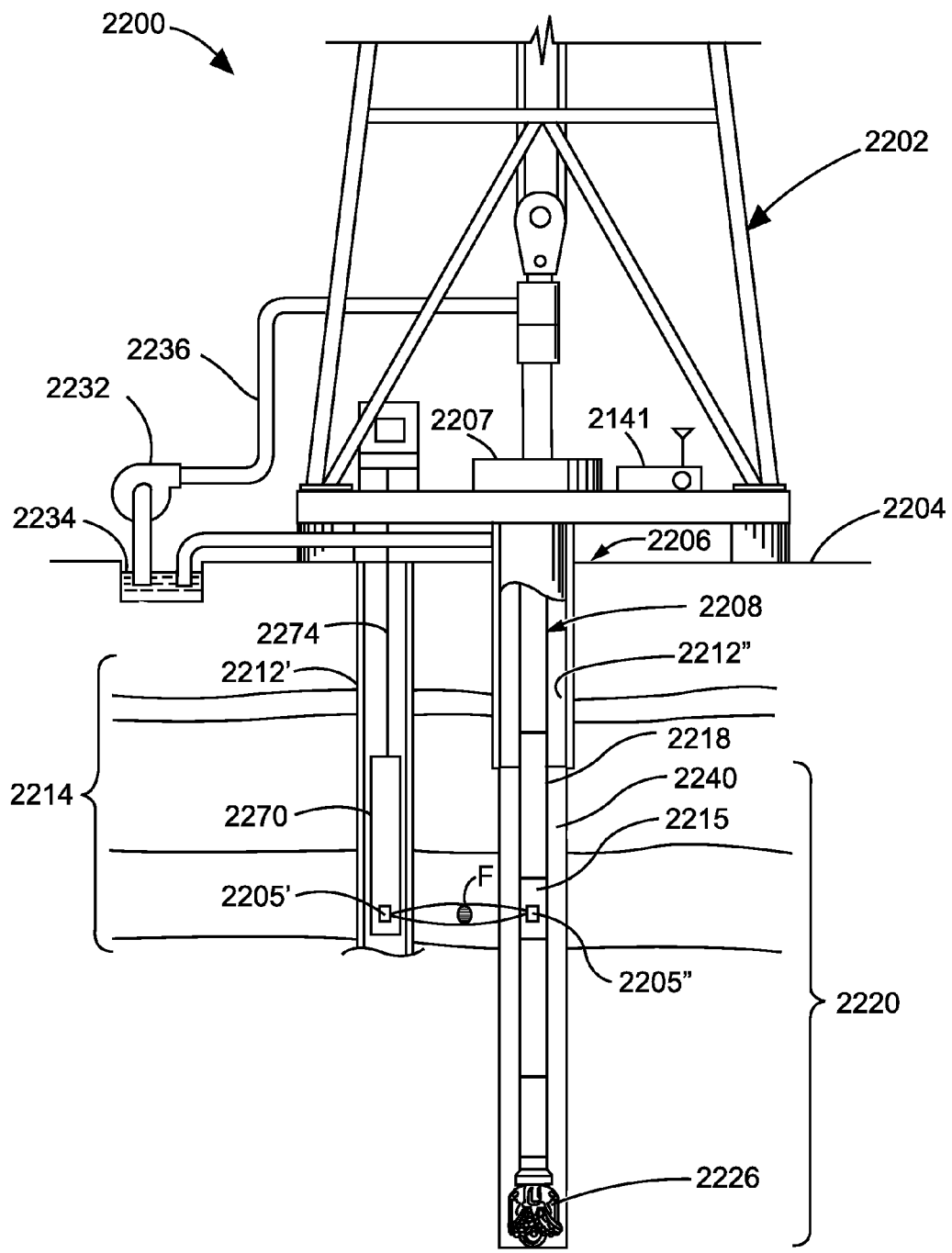
FIG. 13 depicts an embodiment of a system at a drilling site, where the system includes one or more multi-pole antenna tools that provide cross-well tomography in accordance with various embodiments.

FIG. 13 depicts an embodiment of a system 2200 at a drilling site, where the system 2200 includes one or more tools 2205 configured with antennas operable as a system of multi-pole antennas, to provide cross-well tomography in accordance with various embodiments. A control unit and processing unit of the tool 2205 can be distributed among system 2200 or can be integrated with tool 2205 providing for control and analysis activities to be conducted downhole. The tool 2205 can be realized in a similar or identical manner to arrangements and processing discussed herein to make measurements in a borehole and to process the signals and data generated from signals acquired at the tool 2205. The system 2200 can include a drilling rig 2202 located at a surface 2204 of a well 2206 and a string of drill pipes, that is, the drill string 2208, connected together so as to form a drilling string that is lowered through a rotary table 2207 into a wellbore or borehole 2212. The drilling rig 2202 can provide support for the drill string 2208. The drill string 2208 can operate to penetrate the rotary table 2207 for drilling the borehole 2212 through subsurface formations 2214. The drill string 2208 can include drill pipe 2218 and a bottom hole assembly 2220 located at the lower portion of the drill pipe 2218.

The bottom hole assembly 2220 can include a drill collar 2215, the tool 2205 attached to the drill collar 2215, and a drill bit 2226. The drill bit 2226 can operate to create the borehole 2212 by penetrating the surface 2204 and the subsurface formations 2214. The tool 2205 can be structured for an implementation in the borehole 2212 as a MWD system such as a LWD system. The housing containing the tool 2205 can include electronics to activate one or more transmitters of the tool 2205 and collect responses from one or more receivers of the tool 2205. Such electronics can include a processing unit to provide formation analysis, borehole analysis, or combinations thereof to the surface over a standard communication mechanism for operating a well. Alternatively, electronics can include a communications interface to provide signals output by receivers of the tool 2205 to the surface over a standard communication mechanism for operating a well, where these output signals can be analyzed at a processing unit at the surface to provide formation analysis, borehole analysis, or combinations thereof.

During drilling operations, the drill string 2208 can be rotated by the rotary table 2207. In addition to, or alternatively, the bottom hole assembly 2220 can also be rotated by a motor (e.g., a mud motor) that is located downhole. The drill collars 2215 can be used to add weight to the drill bit 2226. The drill collars 2215 also can stiffen the bottom hole assembly 2220 to allow the bottom hole assembly 2220 to transfer the added weight to the drill bit 2226, and in turn, assist the drill bit 2226 in penetrating the surface 2204 and subsurface formations 2214.

During drilling operations, a mud pump 2232 can pump drilling fluid (sometimes known by those of skill in the art as "drilling mud") from a mud pit 2234 through a hose 2236 into the drill pipe 2218 and down to the drill bit 2226. The drilling fluid can flow out from the drill bit 2226 and be returned to the surface 2204 through an annular area 2240 between the drill pipe 2218 and the sides of the borehole 2212. The drilling fluid may then be returned to the mud pit 2234, where such fluid is filtered. In some embodiments, the drilling fluid can be used to cool the drill bit 2226, as well as to provide lubrication for the drill bit 2226 during drilling operations. Additionally, the drilling fluid may be used to remove subsurface formation 2214 cuttings created by operating the drill bit 2226.

In various embodiments, the tool 2205 may be included in a tool body 2270 coupled to a logging cable 2274 such as, for example, for wireline applications. The tool body 2270 containing the tool 2205 can include electronics to activate one or more transmitters of the tool 2205 and collect responses from one or more receivers of the tool 2205. Such electronics can include a processing unit to provide formation analysis, borehole analysis, or combinations thereof to the surface over a standard communication mechanism for operating a well. In some embodiments, the electronics can include a communications interface to provide signals output by receivers of the tool 2205 to the surface over a standard communication mechanism for operating a well, where these output signals can be analyzed at a processing unit at the surface to provide formation analysis, borehole analysis, or combinations thereof. The logging cable 2274 may be realized as a wireline (multiple power and communication lines), a mono-cable (a single conductor), and/or a slick-line (no conductors for power or communications), or other appropriate structure for use in the borehole 2212.

Tools and methods that utilize multi-pole antennas identical to or similar to embodiments discussed herein may used to produce deep azimuthal focusing of electromagnetic waves and to construct deep 3D images of electromagnetic properties of formations from a single well. This may allow new geological profiling applications and also significantly improve evaluation of formations. Data from this tool may be used to optimize drilling and production operations.

For example, as shown in FIG. 13, multiple tools 2205 may be disposed in two (or more) boreholes 2212 to provide a detailed image of the formation 2214 at the intersectional focus F of the azimuthal sensitivity patterns for each of the tools 2205. The focus F can be adjusted by software or by hardware, depending on the application. If it is software-controlled, then the software is adjusted to change the focus; it is it hardware-controlled, then the focus is adjusted by the functions of the signal processing hardware.

The wells in which the tools 2205 are disposed may have laterals; they may be branching, and they may have multiple branches. Transmitters and receivers can be placed in different branches of these wells and imaging can be accomplished between the branches of the wells. The transmitters and receivers can be permanently placed in the wells, or they can be located in one or more production tools that can be lowered into the wells. These wells may be openhole wells, or they may be cased wells.

The presence of casing in various applications should be noted, since the available signal levels may be significantly reduced. This is because the transmitted signal passes through the casing material, which is conductive. Because the casing attenuates electromagnetic signals, the transmitted signal is reduced to by an order of almost two magnitudes from its original amplitude after crossing a casing boundary. Thus, if casing is set in both wells (for cross-well imaging applications), the signal is reduced another two orders of magnitude, so that the signal arriving at a receiver is only about one ten-thousandth of its original value. To provide useful signal levels then, some of the antennas can be placed outside the casing. When the antennas are placed outside the casing, a link between the antennas and the surface may be used, perhaps implemented using a line outside the casing to the surface.

In cross-well tomography applications, the number of transmitters and receivers may be the same, or different. The transmitters and receivers can be used at different angles, focusing on the target portion of the formation (i.e., the portion to be imaged) from different angles. This can be accomplished using transmitters and receivers emplaced to encircle the targeted portion of the formation, such as a reservoir. Thereafter, the transmitters and receivers are activated at different times to enable the use of all combinations of all transmitters and receivers. For example, if there are 100 transmitters and 100 receivers around the target, then there are 10,000 different combinations of each. An actual application may not use as many as 100; it may use 10, or it may use as few as three or four. In a scenario in which three or four wells are used with three or four transmitters and receivers, different combinations will be activated at different times to create spatially diverse information.

If imaging is performed with a production logging tool, then the tool may be moved up and down within the reservoir to yield information at various depths. If a large number of transmitter and receiver positions are used within several wells, and the production tools are moved to various locations within the wells to obtain measurements, the combination of all transmitters and receivers will yield a great deal of information which will result in metrics of measurements. This will provide detailed information about the reservoir, as a target of the imaging activity. The ultimate goal is to obtain an image of the reservoir with uniformly high resolution.

For example, referring to FIG. 13, a system 2200 configured to provide cross-well images of the formation 2214 between two or more boreholes may comprise a number of elements, with the details of construction and operation depending on whether the multi-pole antennas in a particular borehole comprise multi-pole receiving antennas, multi-pole transmitting antennas, both, or neither. In some embodiments, the transmitter antennas are in a first borehole, and the receiver antennas are in a second borehole. In some embodiments, multi-pole transmitter antennas and receiver antennas reside in the same borehole. Thus, many embodiments may be realized.

In a first case, consider that formation imaging can be accomplished using a transmitting antenna in a first borehole, and a receiving antenna in a second borehole, with at least one of the transmitter antenna or the receiving antenna being a multi-pole antenna.

In this first case, a system 2200 may comprise a number of transmitting antennas arranged on a first tool structure 2205' in a first borehole 2212', and a number of receiving antennas arranged on a second tool structure 2205" in a second borehole 2212".

As noted elsewhere in this document, the receiving antennas may be operable to acquire a signal in response to selective activation of the number of transmitting antennas, such that the number of transmitting antennas, or the number of receiving antennas include one or more antennas structured as a multi-pole antenna, with the number of transmitting antennas and the number of receiving antennas being arranged to generate deep high-order azimuthal sensitivity. The system 2200 may further include a control unit 2141 arranged to control the selective activation of the number of transmitting antennas and to acquire signals selectively from the number of receiving antennas in response to the selective activation.

In some embodiments of the first case, both the transmitting antennas and the receiving antennas may comprise multi-pole antennas. Thus, the number of transmitting antennas may include one or more multi-pole transmitter antennas and the number of receiving antennas may include one or more multi-pole receiver antennas, the one or more multi-pole transmitter antennas and the one or more multi-pole receiver antennas arranged to generate deep high-order azimuthal sensitivity.

In some embodiments of the first case, magnetic dipoles, included in the transmitters and/or receivers, may be used to accomplish deep high-order azimuthal sensitivity. Thus, the number of transmitting antennas and the number of receiving antennas may be arranged to establish deep high-order azimuthal sensitivity by using a combination of magnetic dipoles.

In some embodiments of the first case, a combination of deep high-order azimuthal sensitivity modes may be used to accomplish deep azimuthal focusing. Thus, the number of transmitting antennas and the number of receiving antennas may be arranged to establish deep azimuthal focusing by using a combination of deep high-order azimuthal sensitivity modes.

In some embodiments of the first case, transmitting antennas and receiving antennas in each of the multiple boreholes may be operated in pairs. Thus, the number of transmitting antennas and the number of receiving antennas may be arranged to generate deep high-order azimuthal sensitivity, wherein the number of transmitting antennas include a transmitter wire and the number of receiving antennas include a receiver wire, the transmitter wire and the receiver wire to be operatively controlled as a pair.

In some embodiments of the first case, each tool 2205 may have periodically-wrapped transmitting or receiving antennas. Thus, the transmitter wire may be disposed as a periodic first wrapping around the first tool structure, and the receiver wire may be disposed as a periodic second wrapping around the second tool structure.

In some embodiments of the first case, the transmitter or receiver wrappings may comprise single wires. Thus, at least one of the first periodic wrapping or the second periodic wrapping may be arranged as a single wire having two ends.

In some embodiments of the first case, the transmitter and receiver wrappings on different tools may have differing periodicities. Thus, the first periodic wrapping and the second periodic wrapping may have a period different from each other.

In some embodiments of the first case, the system 2200 may include a mode adder and/or data processing unit 1327, 2144 to implement synthetic signal summation. Thus, the system 2200 may include a mode adder 1327 or a data processing unit 2144 operable with the control unit 2141 to synthetically sum multi-pole excitation modes to establish focusing.

In a second case, consider that formation imaging may be accomplished using a first transmitting antenna and a first receiving antenna attached to a first tool 2205' in a first borehole 2212', and a second transmitting antenna and a second receiving antenna attached to a second tool 2205" in a second borehole 2212", with at least one of the first transmitting antenna or the first receiving antenna comprising a multi-pole antenna.

In this second case, a system 2200 comprises a number of first transmitting antennas and first receiving antennas arranged on a first tool structure 2205' to be placed in a first borehole 2212', and a number of second transmitting antennas and second receiving antennas arranged on a second tool structure 2205" to be placed in a second borehole 2212", wherein at least the second receiving antennas are operable to acquire a signal in response to selective activation of the number of first transmitting antennas, and at least the first receiving antennas are operable to acquire a signal in response to selective activation of the number of second transmitting antennas, such that the number of first transmitting antennas, or the number of first receiving antennas include one or more antennas structured as a multi-pole antenna. As noted elsewhere in this document, and the number of first transmitting antennas and the number of second receiving antennas, or the number of second transmitting antennas and the number of first receiving antennas, can be arranged to generate deep high-order azimuthal sensitivity.

The system 2200 may further include a control unit 2141 arranged to control the selective activation of the first and the second number of transmitting antennas, and to acquire signals selectively from the first and the second number of receiving antennas in response to the selective activation, wherein the signals can be used to form an image of a geological formation disposed between the first borehole 2212' and the second borehole 2212".

In some of these embodiments of the second case, the transmitters and receivers may both include multi-pole antennas. Thus, the number of transmitting antennas may include one or more multi-pole transmitter antennas and the number of receiving antennas may include one or more multi-pole receiver antennas, the one or more multi-pole transmitter antennas and the one or more multi-pole receiver antennas arranged to generate deep high-order azimuthal sensitivity.

In some of these embodiments of the second case, the transmitting and/or receiving antennas may include magnetic dipoles. Thus, the number of transmitting antennas and the number of receiving antennas may be arranged to establish deep high-order azimuthal sensitivity by using a combination of magnetic dipoles.

In some of these embodiments of the second case, deep high-order azimuthal sensitivity modes may be used to establish deep azimuthal focusing. Thus, the number of transmitting antennas and the number of receiving antennas may be arranged to establish deep azimuthal focusing by using a combination of deep high-order azimuthal sensitivity modes.

In some of these embodiments of the second case, the transmitters and receivers may comprise wires operated in a paired arrangement. Thus, the number of transmitting antennas and the number of receiving antennas may be arranged to generate deep high-order azimuthal sensitivity by including a transmitter wire and a receiver wire to be operatively controlled as a pair, each of the transmitter wire and the receiver wire disposed as a periodic wrapping around the tool structure, each periodic wrapping including a first portion and a second portion, the second portion directed azimuthally back towards the first portion such that in operation current flows in a same azimuthal direction in the first portion and in the second portion.

In some of these embodiments of the second case, the wires may be wrapped, using a single wire for transmitters or receivers. Thus, the periodic wrapping may be arranged as a single wire having two ends.

In some of these embodiments of the second case, the transmitter and receiver wrappings on the same tool may have a different periodicity. Thus, the periodic wrappings may have a period different from each other.

In some of these embodiments of the second case, the transmitters and/or receivers may include dipoles antennas having controllable polarity. Thus, the number of transmitting antennas and the number of receiving antennas may be arranged to generate deep high-order azimuthal sensitivity by including multiple dipole antennas having controlled polarity, the control unit arranged to selectively control the polarity of the multiple dipole antennas.

In some of these embodiments of the second case, the transmitters and/or receivers may include rotatable dipole antennas. Thus, the number of transmitting antennas and the number of receiving antennas may be arranged to generate deep high-order azimuthal sensitivity include multiple dipole antennas operable under controlled rotation by the control unit.

Figure 14:
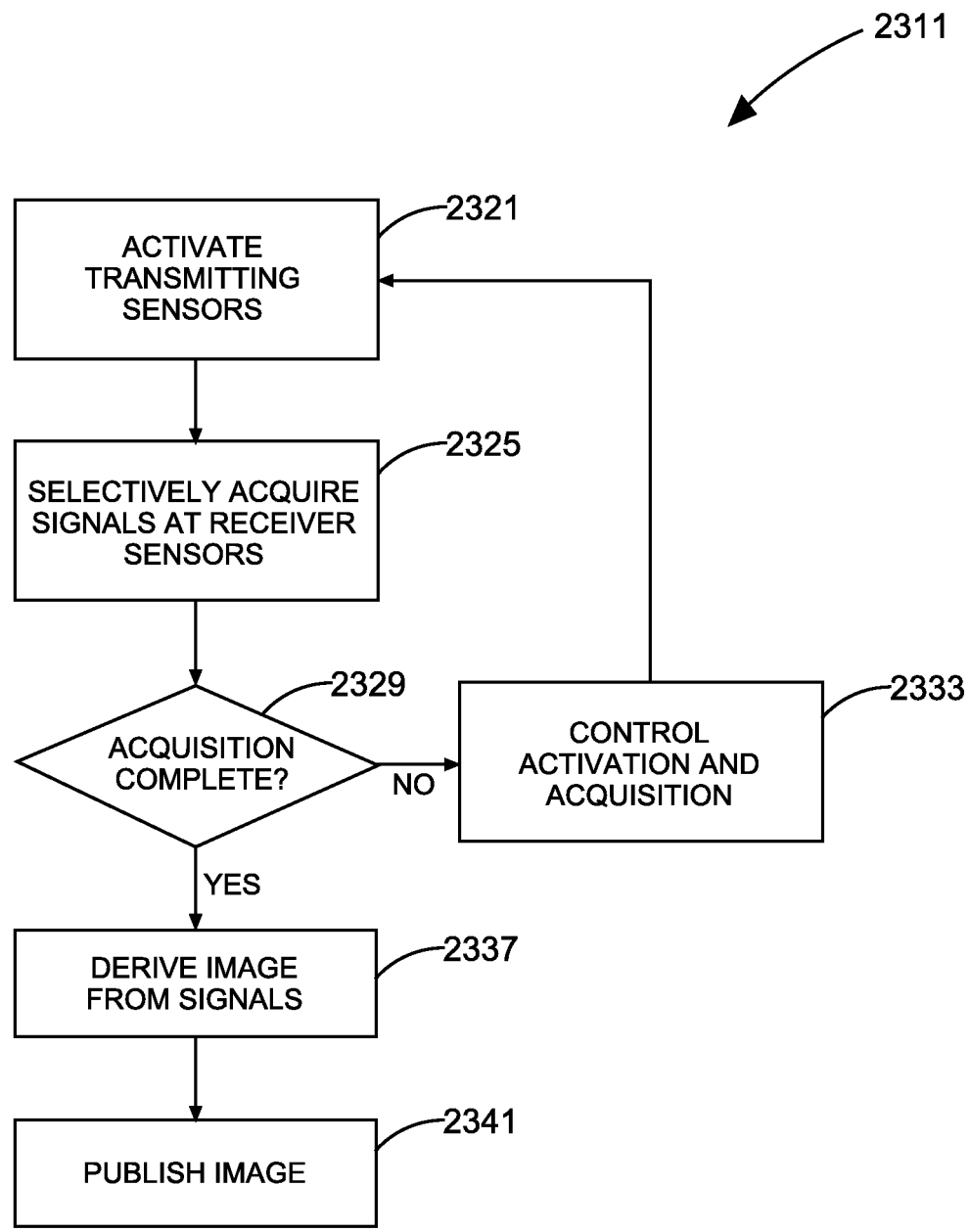
FIG. 14 is a flow chart illustrating methods that provide cross-well formation imaging using various embodiments of the apparatus described herein.

A number of methods may also be implemented with respect to cross-well imaging of a formation using multi-pole antennas. For example, FIG. 14 is a flow chart illustrating methods 2311 that provide cross-well formation imaging using various embodiments of the apparatus described herein. In some embodiments, of the method 2311, transmitters in a first borehole are activated at 2321, and receivers in a second borehole are used to acquire the signals at 2325, where at least the transmitters or receivers include one or more multi-pole antennas. At 2341, an image of the formation between the first and second boreholes is published.

In some embodiments, a processor-implemented method 2311 to execute on one or more processors that perform the method may begin at 2321 with activating one or more transmitting antennas of a first tool disposed in a first borehole to transmit energy into a formation, to produce signals in the formation.

The method 2311 may continue on to 2325 with selectively acquiring some of the signals at one or more receiving antennas of a second tool disposed in a second borehole, in response to transmission by the one or more transmitting antennas, wherein the one or more transmitting antennas, or the one or more receiving antennas, include one or more antennas structured as a multi-pole antenna.

If acquisition of the signals is complete, as determined at 2329, the method 2311 may continue on to 2337. If acquisition is not complete, as determined at 2329, the method 2311 may continue to 2333 with controlling the activating and the selectively acquiring, to sense electromagnetic properties of one or more formations.

In some embodiments, the received signals can be decoupled into various modes, and calibrated. Thus, the activity at block 2333 may comprise decoupling the signals into different azimuthal modes and calibrating the signals, to generate decoupled and calibrated signal data; performing azimuthal focusing, radial focusing, axial focusing, and inversion based on the decoupled and calibrated signal data; and generating data characterizing the formation, the first borehole, or the second borehole. Generating the data may include using a combination of multiple excitation modes in conjunction with one or more multi-pole antennas.

In some embodiments, both the transmitters and receivers may comprise multi-pole antennas. Thus, the activity at block 2333 may comprise operating the one or more transmitting antennas comprising multi-pole transmitter antennas, and the one or more receiving antennas comprising multi-pole receiver antennas, to sense electromagnetic properties of formations. In some embodiments, magnetic dipoles may be used to sense electromagnetic properties of formations.

The method 2311 may continue on to 2337, with deriving an image of the formation from the signals, wherein the formation is disposed between the first borehole and the second borehole.

The method 2311 may continue on to 2341, with publishing an image of one or more electromagnetic properties of the formation.

Implementation of the method 2311, including the multi-pole apparatus and systems described herein, should enable the provision of high quality formation images, overcoming some of the difficulties inherent in conventional approaches. Production enhancements, such as water flooding, may be improved, enabling better reservoir estimates and production. Increased reliability and customer satisfaction may result.

This Detailed Description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. This Detailed Description is, therefore, not to be taken in a limiting sense.

Thus, although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a number of first antennas arranged on a first tool structure in a first borehole;
   a number of second antennas arranged on a second tool structure in a second borehole, wherein the number of first antennas and the number of second antennas each comprises components arranged as a multi-pole antenna which comprises a plurality of dipoles radially distributed around an axis of a corresponding one of the first tool structure and the second tool structure;
   a first control unit arranged to control selective activation of the number of first antennas to create electric fields with substantially n-th order harmonic azimuthal distribution, wherein n is greater than two; and
   a second control unit arranged to control selective activation of the number of second antennas to create electric fields with substantially n-th order harmonic azimuthal distribution, wherein n is greater than two.

2. The system of claim 1, wherein the dipoles comprise magnetic dipoles or electric dipoles.

3. The system of claim 1, wherein the first control unit is arranged to control the number of first antennas to excite or receive a combination of multi-pole excitation modes.

4. The system of claim 1, wherein the number of first antennas include a transmitter wire and a receiver wire, the transmitter wire and the receiver wire to be operatively controlled as a pair.

5. The system of claim 4, wherein the transmitter wire is disposed as a periodic first wrapping around the first tool structure, and wherein the receiver wire is disposed as a periodic second wrapping around the second tool structure.

6. The system of claim 5, wherein at least one of the first periodic wrapping or the second periodic wrapping is arranged as a single wire having two ends.

7. The system of claim 5, wherein the first periodic wrapping and the second periodic wrapping having a period different from each other.

8. The system of claim 1, further comprising:
   a first mode adder or a first data processing unit operable with the first control unit to synthetically sum multi-pole excitation modes of the number of first antennas to establish focusing;
   a second mode adder or a second data processing unit operable with the second control unit to synthetically sum multi-pole excitation modes of the number of second antennas to establish focusing; and
   a third data processing unit operable to generate data characterizing a formation between the first and the second boreholes based on the summed multi-pole excitation modes of the number of first antennas and the summed multi-pole excitation modes of the number of second antennas.

9. The system of claim 1, wherein the first control unit arranged to control selective activation of the number of first antennas to create the electric fields with substantially n-th order harmonic azimuthal distribution comprises the first control unit arranged to control the selective activation of the first antennas to create the electric field $E_q$ in accordance with $E_q(\phi)=K(r)\exp(i(n\phi+\phi_0))$, where $r>r_0$, $\phi$ is an azimuthal angle in cylindrical coordinates that is centered at the first antenna, $\phi_0$ is a phase, $r_0$ is a distance equal to a wavelength of an electromagnetic wave emitted by the number of first antennas, q is a cylindrical or spherical coordinate, and i is the imaginary number i.

10. A system comprising:
a number of first transmitting antennas and a number of first receiving antennas arranged on a first tool structure to be placed in a first borehole;
a number of second transmitting antennas and a number of second receiving antennas arranged on a second tool structure to be placed in a second borehole, wherein the antennas arranged on the first tool structure comprise a first multi-pole antenna and the antennas arranged on the second tool structure comprises a second multi-pole antenna, wherein the first multi-pole antenna comprises a first plurality of dipoles radially distributed around an axis of the first tool structure and the second multi-pole antenna comprises a second plurality of dipoles radially distributed around an axis of the second tool structure; and
a first control unit arranged to control selective activation of the antennas arranged on the first tool structure to create electric fields with substantially n-th order harmonic azimuthal distribution, wherein n is greater than two; and
a second control unit arranged to control selective activation of the antennas arranged on the second tool structure to create electric fields with substantially n-th order harmonic azimuthal distribution, wherein n is greater than two.

11. The system of claim 10, wherein the first plurality of dipoles comprises magnetic dipoles or electric dipoles.

12. The system of claim 10, wherein the first control unit is arranged control the number of first transmitting antennas to excite a combination of multi-pole excitation modes.

13. The system of claim 10, wherein the number of first transmitting antennas and the number of first receiving antennas include a transmitter wire and a receiver wire to be operatively controlled as a pair, wherein the transmitter wire is disposed as a first periodic wrapping around the first tool structure and the receiver wire is disposed as a second periodic wrapping around the first tool structure, each periodic wrapping including a first portion and a second portion, the second portion directed azimuthally back towards the first portion and operable to direct current to flow in a same azimuthal direction in the first portion and in the second portion.

14. The system of claim 13, wherein the at least one of the periodic wrapping is arranged as a single wire having two ends.

15. The system of claim 13, wherein the first periodic wrapping and the second periodic wrapping have a period different from each other.

16. The system of claim 10, wherein the first plurality of dipoles comprise dipoles having controlled polarity, the first control unit arranged to selectively control the polarity of the dipoles having controlled polarity.

17. The system of claim 10, wherein the first plurality of dipoles is arranged to include multiple dipole operable under controlled rotation by the first control unit.

18. The system of claim 10, wherein the first control unit arranged to control selective activation of the antennas arranged on the first tool structure to create electric fields with substantially n-th order harmonic azimuthal distribution comprises the first control unit arranged to control the selective activation of the antennas arranged on the first tool structure to create the electric field $E_q$ in accordance with $E_q(\phi)=K(r)\exp(i(n\phi+\phi_0))$, where $r>r_0$, $\phi$ is an azimuthal angle in cylindrical coordinates that is centered at the antennas arranged on the first tool structure, $\phi_0$ is a phase, $r_0$ is a distance equal to a wavelength of an electromagnetic wave emitted by the antennas arranged on the first tool structure, q is a cylindrical or spherical coordinate, and i is the imaginary number i.

19. The system of claim 10, wherein the second control unit arranged to control selective activation of the antennas arranged on the second tool structure to create electric fields with substantially n-th order harmonic azimuthal distribution comprises the second control unit arranged to control the selective activation of the antennas arranged on the second tool structure to create the electric field $E_q$ in accordance with $E_q(\phi)=K(r)\exp(i(n\phi+\phi_0))$, where $r>r_0$, $\phi$ is an azimuthal angle in cylindrical coordinates that is centered at the antennas arranged on the second tool structure, $\phi_0$ is a phase, $r_0$ is a distance equal to a wavelength of an electromagnetic wave emitted by the antennas arranged on the second tool structure, q is a cylindrical or spherical coordinate, and i is the imaginary number i.

20. A processor-implemented method to execute on one or more processors that perform the method, comprising:
activating a number of first antennas of a first tool disposed in a first borehole to transmit energy into a formation, to produce signals in the formation;
selectively acquiring some of the signals at a number of second antennas of a second tool disposed in a second borehole, in response to transmission by the number of first antennas, wherein the number of first antennas and the number of second antennas each comprises components arranged as a multi-pole antenna which comprises a plurality of dipoles radially distributed around an axis of a corresponding one of the first tool and the second tool;
controlling the activating and the selectively acquiring, to sense electromagnetic properties of formations; and
publishing an image of an electromagnetic property of formations disposed between the first borehole and the second borehole, wherein the image is derived from the signals.

21. The method of claim 20, further comprising:
decoupling the signals into different azimuthal modes and calibrating the signals, to generate decoupled and calibrated signal data;
performing azimuthal focusing, radial focusing, axial focusing, and inversion based on the decoupled and calibrated signal data; and
generating data characterizing the formation, the first borehole, or the second borehole.

22. The method of claim 20, further comprising:
operating the number of first antennas to create the electric field $E_q$ in accordance with $E_q(\phi)=K(r)\exp(i(n\phi+\phi_0))$, where $n>2$ and $r>r_0$, $\phi$ is an azimuthal angle in cylindrical coordinates that is centered at the respective first or second antennas, $\phi_0$ is a phase, $r_0$ is a distance equal to a wavelength of an electromagnetic wave emitted by the number of first antennas, q is a cylindrical or spherical coordinate, and i is the imaginary number.

23. The method of claim 20, at least one first or one second antenna comprises a combination of magnetic dipoles.

\* \* \* \* \*